US008314046B2

(12) United States Patent
Brady et al.

(10) Patent No.: US 8,314,046 B2
(45) Date of Patent: Nov. 20, 2012

(54) HETEROGENEOUS, COMPOSITE, CARBONACEOUS CATALYST SYSTEM AND METHODS THAT USE CATALYTICALLY ACTIVE GOLD

(75) Inventors: John T. Brady, Lino Lakes, MN (US); Marvin E. Jones, Grant, MN (US); Larry A. Brey, Woodbury, MN (US); Gina M. Buccellato, Eagan, MN (US); Craig S. Chamberlain, Woodbury, MN (US); John S. Huberty, St. Paul, MN (US); Allen R. Siedle, Lake Elmo, MN (US); Thomas E. Wood, Stillwater, MN (US); Badri Veeraraghavan, Woodbury, MN (US); Duane D. Fansler, Dresser, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/167,388

(22) Filed: Jun. 23, 2011

(65) Prior Publication Data
US 2011/0280781 A1 Nov. 17, 2011

Related U.S. Application Data

(62) Division of application No. 11/275,416, filed on Dec. 30, 2005, now Pat. No. 8,058,202.

(60) Provisional application No. 60/641,357, filed on Jan. 4, 2005.

(51) Int. Cl.
| | |
|---|---|
| *B01J 21/18* | (2006.01) |
| *B01J 23/00* | (2006.01) |
| *B01J 23/02* | (2006.01) |
| *B01J 23/06* | (2006.01) |
| *B01J 23/04* | (2006.01) |
| *C01B 31/20* | (2006.01) |
| *C01B 31/32* | (2006.01) |

(52) U.S. Cl. ........ 502/184; 502/317; 502/340; 502/344; 423/427; 423/437.2; 423/441; 977/900

(58) Field of Classification Search .................. 502/184, 502/317, 340, 344; 423/427, 437, 441; 977/900
See application file for complete search history.

(56) References Cited

U.S. PATENT DOCUMENTS 3,966,645 A 6/1976 Cairns
(Continued)

FOREIGN PATENT DOCUMENTS

CN 1105288 7/1995
(Continued)

OTHER PUBLICATIONS

Arrii et al., Oxidation of CO on Gold Supported Catalysts Prepared by Laser Vaporization: Direct Evidence of Support Contribution; Journal of the American Chemical Society 2004; 126, 1199-1205.

(Continued)

*Primary Examiner* — Colleen Dunn
*Assistant Examiner* — Jennifer Smith
(74) *Attorney, Agent, or Firm* — Kenneth B. Wood

(57) ABSTRACT

Heterogeneous catalyst systems, methods of making these systems, and methods of using these systems, wherein catalytically active gold is deposited onto composite support media. The composite support media is formed by providing nanoporous material on at least a portion of the surfaces of carbonaceous host material. In representative embodiments, relatively fine, nanoporous guest particles are coated or otherwise provided on surfaces of relatively coarser activated carbon particles. Catalytically active gold may be deposited onto one or both of the guest or host materials either before or after the guest and host materials are combined to from the composite host material. PVD is the preferred catalyst system of depositing gold.

24 Claims, 13 Drawing Sheets

U.S. PATENT DOCUMENTS

| | | | |
|---|---|---|---|
| 4,046,712 | A | 9/1977 | Cairns |
| 4,469,640 | A | 9/1984 | Carcia |
| 4,524,051 | A | 6/1985 | Wright |
| 4,536,375 | A | 8/1985 | Holt |
| 4,536,482 | A | 8/1985 | Carcia |
| 4,618,525 | A | 10/1986 | Chamberlain |
| 4,686,202 | A | 8/1987 | Broecker |
| 4,839,327 | A | 6/1989 | Haruta |
| 4,912,082 | A | 3/1990 | Upchurch |
| 4,994,422 | A | 2/1991 | Goldman |
| 5,058,578 | A | 10/1991 | Weiss |
| 5,068,217 | A | 11/1991 | Falke |
| 5,492,627 | A | 2/1996 | Hagen |
| 5,750,013 | A | 5/1998 | Lin |
| 5,789,337 | A | 8/1998 | Haruta |
| 5,851,452 | A | 12/1998 | Vallet Mas |
| 5,932,750 | A | 8/1999 | Hayashi |
| 6,252,095 | B1 | 6/2001 | Hayashi |
| 6,265,341 | B1 | 7/2001 | Komatsu |
| 6,531,704 | B2 | 3/2003 | Yadav |
| 6,752,889 | B2 | 6/2004 | Insley |
| 7,243,658 | B2 | 7/2007 | Deevi |
| 2003/0042226 | A1 | 3/2003 | Coll |
| 2003/0134741 | A1 | 7/2003 | Weisbeck |
| 2003/0187294 | A1 | 10/2003 | Hagemeyer |
| 2004/0115515 | A1 | 6/2004 | Ueda |
| 2005/0095189 | A1 | 5/2005 | Brey |
| 2005/0274390 | A1 | 12/2005 | Banerjee |
| 2006/0168924 | A1 | 8/2006 | Sun |
| 2006/0293175 | A1 | 12/2006 | Dai et al. |

FOREIGN PATENT DOCUMENTS

| | | |
|---|---|---|
| DE | 4432155 | 3/1996 |
| DE | 10030637 | 1/2002 |
| EP | 0 499 402 | 8/1992 |
| EP | 0 827 779 A | 3/1998 |
| EP | 1 031 378 | 8/2000 |
| EP | 1 040 869 A2 | 10/2000 |
| GB | 1 486 108 A | 9/1977 |
| GB | 2 141 349 | 12/1984 |
| JP | 1-94945 | 4/1989 |
| JP | 5-103996 | 4/1993 |
| JP | 2000-296332 | 10/2000 |
| JP | 2004-146223 | 5/2004 |
| JP | 2004-188243 | 7/2004 |
| RU | 1626495 | 6/1995 |
| SU | 1825654 A1 | 7/1993 |
| WO | WO 97/43042 | 11/1997 |
| WO | WO 98/00413 | 1/1998 |
| WO | WO 99/47726 | 9/1999 |
| WO | WO 00/59632 | 10/2000 |
| WO | WO 2005/030382 A2 | 4/2005 |
| WO | WO 2005/055747 | 6/2005 |
| WO | WO 2005/115612 | 12/2005 |
| WO | WO 2006/002001 A2 | 1/2006 |
| WO | WO 2006/003450 A1 | 1/2006 |
| WO | WO 2006/046145 A2 | 5/2006 |
| WO | WO 2006/064138 A1 | 6/2006 |
| WO | WO 2007/106664 | 9/2007 |

OTHER PUBLICATIONS

Bond, G.C. & Thompson, D.T., "Gold-Catalysed Oxidation of Carbon Monoxide," *Gold Bulletin*, 33(2), pp. 41-51, 2000.

Costelle et al., "Nature of the active Site for CO Oxidation on Highly Active Au/y-$Al_2O_3$," *Applied Catalysis A: General 232*, pp. 159-168, 2002.

Grisel et al., "Catalysis by Gold Nanoparticles," *Gold Bulletin*, 35/2, pp. 39-45, 2002.

Häkkinen & Landman, "Gold clusters ($Au_N$, $2 \leq N \leq 10$) and their anions," *Physical Review B*, vol. 62, No. 4, pp. R2287-R2290, Jul. 2000.

Hersey, J.A., "Ordered Mixing: A New Concept in Powder Mixing Practice," *Powder Technology*, 11, pp. 41-44, 1975.

Kobayashi et al., Thin Films of Supported Gold Catalysts for CO Detection; Sensors and Actuators B1 1990; 222-225.

Lamb et al., "The Removal of Carbon Monoxide from Air," *J. Ind. Eng. Chem.*, vol. 12, No. 3, pp. 213-221, 1920.

Liu et al., "General Rules for Predicting Where a Catalytic Reaction Should Occur on Metal Surfaces: A Density Functional Theory Study of C-H and C-O Bond Breaking/Making on Flat, Stepped, and Kinked Metal Surfaces," *J. Am. Chem. Soc.*, 125, pp. 1958-1967, 2003.

Oh et al., "Selective Catalytic Oxidation of CO: Effect of Chloride on Supported Au Catalysts," *Journal of Catalysis*, vol. 210, pp. 375-386, 2002.

Okamura et al., Preparation of supported gold catalysts by gas-phase grafting of gold acethylacetonate for low-temperature oxidation of CO and of H2; Journal of Molecular Catalysis 2003; 199, 73-84.

Okumura, M., et al.: "Chemical Vapor Deposition of Gold Nanoparticles on MCM-41 and Their Catalytic Activities for the Low-temperature Oxidation of CO and of H2", Chemistry Letters, Chemical Society of Japan, Tokyo, JP, vol. 27, No. 4, 1998, pp. 315-316, XP002322913, ISSN: 0366-7022, the whole document.

Pfeffer et al., "Synthesis of engineered particulates with tailored properties using dry particle coating," *Powder Technology*, vol. 117, pp. 40-67, 2001.

Prati, Laura, et al., "Gold on Carbon as a New Catalyst for Selective Liquid Phase Oxidation of Diols," *Journal of Catalysis* 176, 552-560 (1998).

Sanchez et al., "When Gold Is Not Noble: Nanoscale Gold Catalysts," *J. Phys. Chem. A*, vol. 103, pp. 9573-9578, 1999.

Veith et al., Nanoparticles of Gold on Al2O3 produced by dc magnetron sputtering; Journal of Catalysis 2004; 213, 151-158.

Wang et al., "Influence of pretreatment conditions on low-temperature CO oxidation over $Au/Mo_x/Al_2O_3$ catalysts," *Journal of Molecular Catalysis A: Chemical*, vol. 200, pp. 229-238, 2003.

Wise, High Dispersion Platinum Catalyst by RF Sputtering,: *Journal of Catalysis*, vol. 83, pp. 477-479, 1983.

Wolf & Schuth, "A systematic study of the synthesis conditions for the preparation of highly active gold catalysts," *Applied Catalysis A: General* 226, pp. 1-13, 2002.

Yeong-Jey Chen and Chuin-Tih Yeh, Deposition of Highly Dispersed Gold on Alumina Support, Apr. 18, 2001, vol. 200, Journal of Catalysis, Academy Press, pp. 59-68.

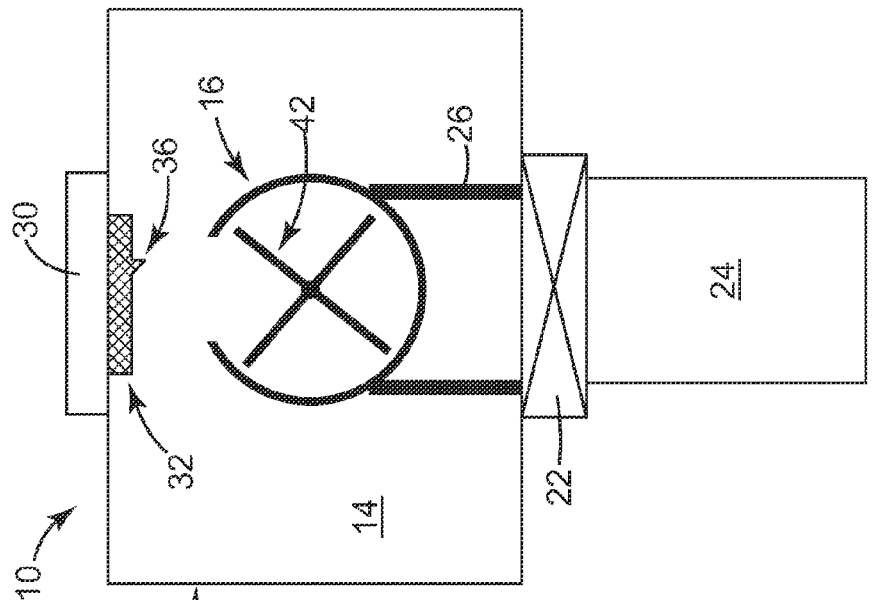
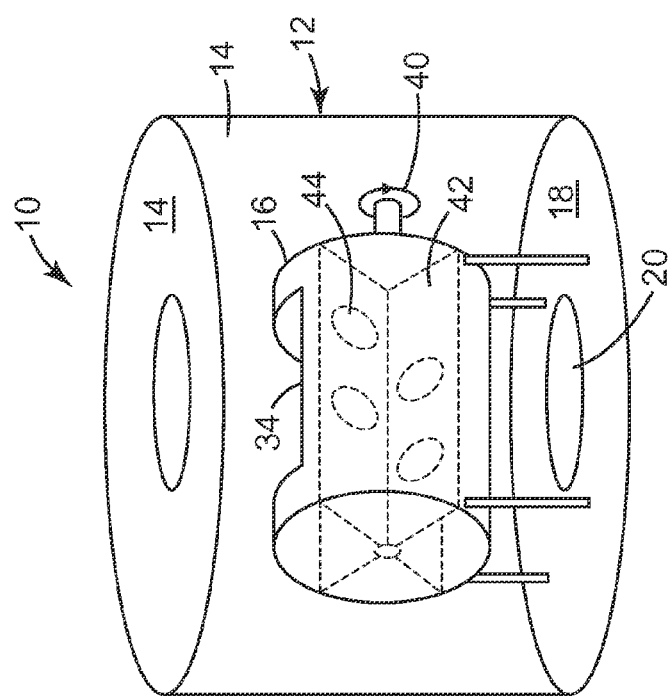

HETEROGENEOUS, COMPOSITE, CARBONACEOUS CATALYST SYSTEM AND METHODS THAT USE CATALYTICALLY ACTIVE GOLD

CROSS-REFERENCE TO RELATED APPLICATIONS

The present application is a divisional of U.S. patent application Ser. No. 11/275,416, filed Dec. 30, 2005, which claimed the benefit of U.S. Provisional Patent Application Ser. No. 60/641,357, filed Jan. 4, 2005, the disclosures of both of which are incorporated herein by reference in their entirety.

FIELD OF THE INVENTION

The present invention relates to gold-based catalyst systems in which catalytically active gold is provided on composite support media.

BACKGROUND OF THE INVENTION

Carbon monoxide is a toxic gas formed by incomplete burning of organic materials. Carbon monoxide combines with blood hemoglobin to form carboxyhemoglobin which is ineffective at transporting oxygen to body cells. Inhalation of air containing 1-2% (10,000 to 20,000 ppm) CO by volume will cause death within several minutes. CO concentrations higher than 1200 ppm are considered immediately dangerous to life and health by the U.S. National Institute of Occupational Safety and Health (NIOSH).

CO is responsible for many of the fatalities in fires. It is also encountered in mining operations in which explosives are used in confined spaces. CO is also present in the exhausts of gasoline or diesel powered internal combustion engines. Poorly operating engines, machinery, heating equipment, ventilation equipment, air conditioning equipment, and other equipment may also output CO, contaminating the air in buildings and vehicles. Consequently, there is a strong need for protection against CO in these and other environments in which persons could encounter the gas.

Firefighters and other emergency response personnel have been equipped with self-contained respirators using compressed air or oxygen in cylinders to provide protection against CO. These devices tend to be heavy, bulky, expensive and require special training for effective use. It is not feasible to equip everyone in an area with such devices.

A fire or other sudden unexpected release of carbon monoxide in a building, public place, vehicle, or the like may require that individuals quickly escape from an area containing dangerous concentrations of the gas. In these situations, an easy-to-use, lightweight respirator or mask equipped with media capable of protecting against carbon monoxide would be desirable.

Protection against CO is also desirable in the cabin environment of a car, truck, rail-borne vehicle, marine vessel, or other mode of transport. In many heavily congested traffic areas and in tunnels, elevated levels of CO can develop from the accumulation of exhaust emissions. Typically, the CO levels encountered are usually less than 200 to 300 ppm, but even these CO levels can cause headaches, dizziness and nausea to drivers and passengers. In these applications, large volumes of gas and high flow rates can be encountered. Thus, the residence time of the cabin air on the catalyst is short, being less than 0.05 seconds and even less than 0.03 seconds. It is therefore desirable to have a catalyst that can also remove CO under these conditions.

However, the low boiling point and high critical temperature of CO make its removal by physical adsorption very difficult when the CO is present at room temperature. Conventional gas mask canisters and filters based on activated carbon adsorbents have been relatively useless as a practical matter against high concentrations of carbon monoxide.

Catalytic oxidation to carbon dioxide is one feasible method for removing carbon monoxide from air at the high concentrations and flow rates required for individual respiratory protection. However, most CO oxidation catalysts are only active at temperatures of 150° C. or higher. This is true even though oxidation to $CO_2$ is thermodynamically favored. Very few CO oxidation catalysts are active at room temperature or below. A catalyst useful for respiratory protection against CO desirably functions at low temperatures.

Two types of catalysts that are known for low temperature CO oxidation include transition metal oxides (mostly mixed oxides of Cu, Mn, and/or Co) and supported noble metal catalysts. One widely used transition metal oxide for low temperature CO oxidation is hopcalite. Hopcalite is a mixed oxide of manganese and copper developed during World War I by the U.S. Bureau of Mines and the Chemical Warfare Service of the U.S. Army [Lamb, Bray, and Frazer, *J. Ind. Eng. Chem.*, 12, 213 (1920)]. Hopcalite is a very active catalyst for CO oxidation even at temperatures as low as −20° C. The major disadvantage of hopcalite is that its capability for CO oxidation is quickly destroyed by water vapor in the air. This means that a respirator filter with a hopcalite catalyst must include a drier bed on the inlet side of the filter. The useful life of the respirator filter is determined by the capacity and efficiency of the drier bed. Even a filter designed for short term use (~30 minutes) at high breathing rates will require a desiccant bed of larger volume than the catalyst bed itself. Hopcalite is commercially available from Cams Chemical Company, 315 Fifth Street, Peru, Ill. 61354 USA under the designation Carulite 300.

Catalytic oxidation of CO over supported platinum group metals (most often Pt, Pd, Rh, Ru, and Ir) has been known for many years. However, most of these catalysts are only active at temperatures around 150° C.

In recent years, supported platinum group metal catalysts have been developed that function at lower temperatures. In addition to a platinum group metal, these catalysts may also contain so-called "reducible metal oxides" such as $SnO_x$, $CeO_x$, and $FeO_x$. It is thought that the reducible oxides provide sites that dissociatively adsorb $O_2$, thereby promoting low temperature CO oxidation. U.S. Pat. No. 4,536,375 and Published UK Patent Application GB 2,141,349 discuss these catalysts and their use in respiratory protection devices. A low temperature CO oxidation catalyst of this type is commercially available from Molecular Products Ltd, Mill End, Thaxted, Essex CM6 2LT, United Kingdom under the designation Sofnocat® 423. It contains platinum, palladium, and $SnO_2$.

These platinum-based catalysts are much more tolerant of water vapor than is hopcalite. However, operation at high relative humidity (RH) with low CO inlet concentrations results in capillary condensation of water vapor in the micropores of the catalyst support (usually alumina or silica-gel). This causes slow loss of activity as access to active sites is blocked by condensed water. A significant disadvantage of these catalysts is the high loading of expensive platinum group metal necessary to meet the requirements for respiratory protection against CO.

It has been observed that nanoislands of very finely divided gold on reducible oxide supports are very active for CO oxidation at low temperature. At ambient to sub-ambient temperatures, the best gold catalysts are considerably more active for CO oxidation than the most active promoted platinum group metal catalyst known. Gold is also considerably cheaper than platinum. Catalytically active gold, though, is quite different from the platinum group metal catalysts discussed above. The standard techniques used in the preparation of supported platinum group metal catalysts give inactive CO oxidation catalysts when applied to gold. Different techniques, therefore, have been developed for deposition of finely divided gold on various supports. Even so, highly active gold catalysts have been difficult to prepare reproducibly. Scaleup from small lab preparations to larger batches has also proved difficult.

These technical challenges have greatly hindered the industrial application of gold catalysts. This is unfortunate since the very high activities of gold catalysts for CO oxidation at ambient and sub-ambient temperatures and their tolerance for high water vapor concentrations make them otherwise strong candidates for use in respiratory protection filters and in other applications in which oxidation of CO would be desired.

Because ultra-fine particles of gold generally are very mobile and possess large surface energies, ultra-fine particles of gold tend to coagulate easily. This tendency to coagulate makes ultrafine gold hard to handle. Coagulation also is undesirable inasmuch as the catalytic activity of gold tends to fall off as its particle size increases. This problem is relatively unique to gold and is much less of an issue with other noble metals such as platinum (Pt) and palladium (Pd). Thus, it is desired to develop methods to deposit and immobilize ultra-fine gold particles on a carrier in a uniformly dispersed state.

Known methods to deposit catalytically active gold on various supports recently have been summarized by Bond and Thompson (G. C. Bond and David T. Thompson, *Gold Bulletin,* 2000, 33(2) 41) as including (i) coprecipitation, in which the support and gold precursors are brought out of solution, perhaps as hydroxides, by adding a base such as sodium carbonate; (ii) deposition-precipitation, in which the gold precursor is precipitated onto a suspension of the preformed support by raising the pH, and (iii) Iwasawa's method in which a gold-phosphine complex (e.g., $[Au(PPh_3)]NO_3$) is made to react with a freshly precipitated support precursor. Other procedures such as the use of colloids, grafting and vapor deposition, have met with varying degrees of success.

These methods, however, suffer from difficulties aptly described by Wolf and Schuth, Applied Catalysis A: General, 2002, 226 (1-2) 1-13 (hereinafter the Wolf et al. article). The Wolf et al. article states that "[a]lthough rarely expressed in publications, it also is well known that the reproducibility of highly active gold catalysts is typically very low." The reasons cited for this reproducibility problem with these methods include the difficulty in controlling gold particle size, the poisoning of the catalyst by ions such as Cl, the inability of these methods to control nano-sized gold particle deposition, the loss of active gold in the pores of the substrate, the necessity in some cases of thermal treatments to activate the catalysts, inactivation of certain catalytic sites by thermal treatment, the lack of control of gold oxidation state, and the inhomogeneous nature of the hydrolysis of gold solutions by the addition of a base.

In short, gold offers great potential as a catalyst, but the difficulties involved with handling catalytically active gold have severely restricted the development of commercially feasible, gold-based, catalytic systems.

German Patent Publication DE 10030637 A1 describes using PVD techniques to deposit gold onto support media. The support media described in this document, though, are merely ceramic titanates made under conditions in which the media would lack nanoporosity. Thus, this document fails to indicate the importance of using nanoporous media to support catalytically active gold deposited using PVD techniques. International PCT Patent Publications WO 99/47726 and WO 97/43042 provide lists of support media, catalytically active metals, and/or methods for providing the catalytically active metals onto the support media. These two documents, however, also fail to appreciate the benefits of using nanoporous media as a support for catalytically active gold deposited via PVD. Indeed, WO 99/47726 lists many preferred supports that lack nanoporosity.

Relatively recently, very effective, heterogeneous catalyst systems and related methodologies using catalytically active gold have been described in assignee's co-pending United States patent application having U.S. Ser. No. 10/948,012, titled CATALYSTS, ACTIVATING AGENTS, SUPPORT MEDIA, AND RELATED METHODOLOGIES USEFUL FOR MAKING CATALYST SYSTEMS ESPECIALLY WHEN THE CATALYST IS DEPOSITED ONTO THE SUPPORT MEDIA USING PHYSICAL VAPOR DEPOSITION in the names of Larry Brey et al., and filed Sep. 23, 2004, the entirety of which is incorporated herein by reference (hereinafter referred to as Assignee's Co-pending Application). In particular, Assignee's Co-pending Application describes providing catalytically active gold on a composite support derived from relatively fine titania particles (referred to as guest material) that at least partially coat the surfaces of relatively large alumina particles (referred to as host material). These composite systems provide excellent catalytic performance with respect to CO oxidation. However, improvements are still desired. Notably, it would be desirable to provide gold-based catalyst systems that demonstrate a faster response to changes in incident CO challenges. It is further desirable for gold-based catalysts to provide longer lasting protection against CO. It is also desirable to use such catalysts in respiratory protection systems that provide protection against not only CO but other airborne contaminants as well.

SUMMARY OF THE INVENTION

The present invention relates to heterogeneous catalyst systems, methods of making these systems, and methods of using these systems, wherein catalytically active gold is deposited onto composite support media. The composite support media is formed by providing nanoporous material on at least a portion of the surfaces of carbonaceous host material. In representative embodiments, relatively fine, nanoporous guest particles are coated or otherwise provided on surfaces of relatively coarser activated carbon particles. Catalytically active gold may be deposited onto one or both of the guest or host materials either before or after the guest and host materials are combined to from the composite host material.

Carbonaceous material, especially activated carbon particles, is a preferred host material for a variety of reasons. Firstly, composite catalysts incorporating carbonaceous host material have shown a significantly faster response time for CO oxidation when challenged with a 4×, stepwise increase in CO as compared to composite catalysts incorporating alumina host material. Composite catalysts incorporating carbonaceous host material also provide very long-lasting protection against CO. The composite catalyst system of the present invention also catalytically oxidizes the CO in ambient air streams, although the catalytic oxidation of CO will tend to generate heat and raise the temperature of the composite during the course of catalytic oxidation.

Unlike some other host material, carbonaceous host material also can function as a filtering medium for organic gases and vapors, thereby filtering organic contaminants from an air or other gaseous stream. Carbonaceous material can also be impregnated with one or more impregnants (described further below) to provide additional filtering capabilities. According to conventional wisdom, one generally might expect adding guest material to be accomplished at the expense of one or more of such other filtering abilities at least to some significant degree. This is based partly upon the circumstances that a carbonaceous medium can only incorporate a finite quantity of one or more reactive impregnants before its capacity to hold additional impregnants is essentially saturated. Thus, one typically must balance and compromise among several desired objectives when deciding what kinds and how much of different impregnants are to be incorporated into a support. For instance, if one desires to add more triethylenediamine (TEDA) impregnant to a carbonaceous support to provide additional protection against cyanogen chloride, the extra TEDA present could reduce to some degree the amount of organic protection that might otherwise be provided if a lesser amount of TEDA were to be used. Surprisingly, however, providing guest material on the carbonaceous host has very little, if any, practical impact upon the organic filtering ability of the carbonaceous host material with respect to inherent filtering capabilities (e.g., the ability to protect against organic vapors) or with respect to filtering capabilities provided by one or more impregnants incorporated into or on the carbonaceous material. In short, guest material may be added to a carbonaceous host without unduly limiting other filtering benefits offered by the host.

As another advantage of carbonaceous host material, these materials readily associate with guest materials such as titania particles. Carbonaceous material also has a much lower density than some other hosts such as alumina. Filters containing composites with carbonaceous hosts thus weigh less than an equal volume of composites with alumina hosts. Carbonaceous host material is also inexpensive, making carbonaceous host material very economical to use.

The gold-based catalyst systems of the present invention have excellent catalytic performance. These systems would find application in the area of CO abatement in the form of personal, vehicle and building protection, catalysts and catalyst supports for the purification of exhaust gases from internal combustion engines, removal of CO from fuel cell feedstocks, and in catalyzing other oxidation reactions such as the oxidation of carbonaceous soot in diesel exhaust streams and the selective oxidation of organic compounds. For instance, the gold-based catalyst systems would be suitable as catalyst systems for the catalytic oxidation of unsaturated and saturated hydrocarbons. The term hydrocarbon means unsaturated or saturated hydrocarbons such as olefins or alkanes. The hydrocarbon can also contain heteroatoms like N, O, P, S or halogens. The organic compounds to be oxidized may be acyclic, monocyclic, bicyclic, or polycyclic and may be mono-olefinic, di-olefinic, or poly-olefinic. The double bonds in compounds with two or more double bonds may be conjugated or non-conjugated.

In one aspect, the present invention relates to a method of making a heterogeneous catalyst system. Catalytically active gold is incorporated into a composite, nanoporous support medium derived from ingredients comprising guest material and carbonaceous host material. In preferred embodiments, the catalytically active gold is deposited onto the support medium under conditions such that the system comprises 0.005 to 5 weight percent gold based on the total weight of the gold and the support medium. It is also preferred that the host material comprises activated carbon particles and that the guest material comprises titania. The method may further comprise the step of impregnating a water soluble salt onto the host material, wherein said impregnation occurs prior to the gold deposition.

In another aspect, the present invention relates to a heterogeneous catalyst system. The system includes a nanoporous, composite support medium derived from ingredients comprising relatively fine guest particles and relatively coarse carbonaceous particles. Catalytically active gold is deposited onto the support medium, preferably using physical vapor deposition.

In another aspect, the present invention relates to a method of oxidizing CO. A heterogeneous catalyst system is provided. The system includes a nanoporous, composite support medium derived from ingredients comprising relatively fine guest particles and relatively coarse carbonaceous particles; a promoting amount of an alkali metal salt present on the composite support medium; and catalytically active gold present on the composite support medium. The heterogeneous catalyst system is caused to catalytically contact the CO.

In another aspect, the present invention relates to a method of making a catalyst system. A plurality of relatively fine, nanoporous guest particles is incorporated onto relatively larger, carbonaceous host particles to form a plurality of composite particles. Catalytically active gold is deposited onto the composite particles using physical vapor deposition.

In another aspect, the present invention relates to a method of making a catalyst system. Catalytically active gold is deposited onto a plurality of relatively small, nanoporous guest particles using physical vapor deposition. After the gold deposition, the nanoporous guest particles are incorporated onto a plurality of relatively large, carbonaceous host particles.

In another aspect, the present invention relates to a method of making a heterogeneous catalyst system. A plurality of relatively fine, nanoporous particles and a plurality of relatively coarser, carbonaceous particles are incorporated into a plurality of composite particles. Catalytically active gold is deposited onto the composite particles using physical vapor deposition.

In another aspect, the present invention relates to a heterogeneous, catalyst system, comprising a plurality of composite, catalytically active particles, wherein said composite, catalytically active particles are derived from ingredients comprising relatively fine particles and, relatively coarser, carbonaceous particles, and wherein the composite particles comprise catalytically active gold deposited onto the relatively fine particles using physical vapor deposition.

In another aspect, the present invention relates to a heterogeneous, catalyst system, comprising a plurality of relatively fine particles deposited onto a relatively coarser, carbonaceous support medium, and wherein the system comprises catalytically active gold.

In another aspect, the present invention also relates to respiratory protection system comprising a heterogeneous catalyst system made in accordance with the principles of the present invention and/or incorporating features of a heterogeneous catalyst system of the present invention. The protection system may constitute all or a portion of a personal respiratory protection system, a building respiratory protection system, a vehicle respiratory protection system, a mask, an escape hood, an air purification device, etc.

BRIEF DESCRIPTION OF THE DRAWINGS

FIG. 2 is a schematic perspective view of the apparatus of FIG. 2.

FIG. 3 is a schematic side view of an apparatus for carrying out a PVD process for depositing catalytically active gold onto a support.

DETAILED DESCRIPTION

Figure 1:
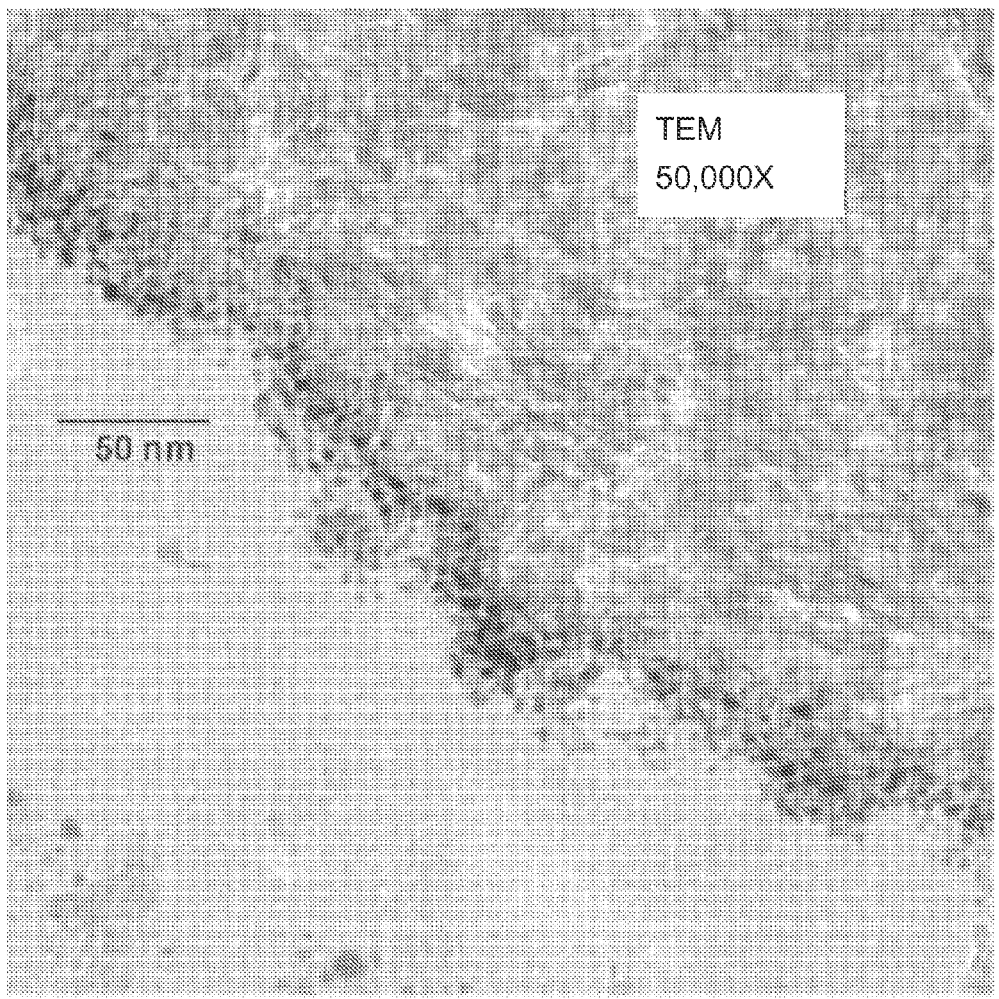
FIG. 1 is a TEM image of a cross-section of a representative catalyst surface of the present invention (material of Example 3 of Assignee's Co-Pending Application cited above).

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. While the present invention will be described in the specific context of gold-based catalyst systems, the principles of the invention are applicable to other catalyst systems as well.

In the practice of the present invention, catalytically active gold may be deposited on the desired support(s) in any fashion, but preferably is deposited using physical vapor deposition. Physical vapor deposition refers to the physical transfer of gold from a gold-containing source or target to the support. Physical vapor deposition may be viewed as involving atom-by-atom deposition although in actual practice, the gold may be transferred as extremely fine bodies constituting more than one atom per body. Once at the surface, the gold may interact with the surface physically, chemically, ionically, and/or otherwise. Using physical vapor deposition methodologies to deposit nanoscale gold on activating, nano-porous support media makes the synthesis of catalytically active gold dramatically easier and opens the door to significant improvements associated with developing, making, and using gold-based, catalytic systems.

Some modes of practice, particularly those using lower amounts of deposited gold, involve depositing gold via PVD only after the support media has been impregnated with one or more activating agents and/or other impregnant(s), dried, and optionally calcined or otherwise heat treated. This greatly expands the range of activating agents that can be used in combination with a catalytically active metal. We can use ingredients that would otherwise react or be too soluble in solution when wet methods are used to deposit gold. For instance, the process of the invention can deposit gold or other metals onto media comprising very basic or water-soluble materials. This has opened the door to testing and using water soluble, metal salts as activating agents inasmuch as these are not washed away when gold is subsequently deposited via PVD. It would not be very practical to attempt to use such salts as activating agents when gold is impregnated onto the support media via solution processing, inasmuch as the gold solutions could wash away the water soluble material and/or be chemically incompatible with the activating agents (e.g., gold solutions tend to be strongly acidic, e.g., $HAuCl_4$).

We have observed that a catalytically active metal such as gold is active right away when deposited via PVD. There is no need to heat treat the system after gold deposition as is the case with some other methodologies, although such heat treating may be practiced if desired. Additionally, the gold is highly active catalytically for relatively long periods with respect to CO oxidation, even though it tends to be deposited only proximal to the support media surface when using PVD to deposit the gold. The catalyst systems also are effective in humid environments and work over a wide temperature range, including room temperature (e.g., about 22° C. to about 27° C.) and much cooler (e.g., less than 5° C.).

The physical vapor deposition process is very clean in the sense that there are no impurities introduced into the system as in the case of the solution state processes. In particular, the process may be chloride-free and thus there is no need for washing steps to remove chloride or other undesirable ions, molecules or reaction by-products, as is the case in most solution state deposition processes.

By using this process, very low levels of metal are required for high activity. While most research in this area uses at least 1% by weight gold to achieve activity, and often times much more than 1 weight % gold to achieve high activity, in this work we have achieved very high activity at 0.15% by weight gold or lower. This reduction in the amount of precious metal required for high activity provides a very substantial cost savings. Yet, other embodiments of the present invention, such as guest/host composite systems, provide high performance using higher levels of gold, e.g., 0.5% to 5% by weight gold.

This process results in a very uniform product with respect to precious metal concentration per particle and metal nanoparticle size and size distribution. TEM studies have shown that our process can deposit gold in a form including discrete nanoparticles and small clusters or in a more continuous thin film depending on what is desired. In general, it is desired to include gold in nanoparticle/small gold cluster form.

This catalyst preparation method can deposit catalyst metals uniformly on non-uniform or non-homogeneous surfaces. This is not true for the solution state deposition processes that tend to favor deposition on the surfaces having a charge opposite to the depositing metal ion, leaving the other surfaces uncoated or at best weakly coated.

In addition to gold, the PVD process can be used to deposit other metals simultaneously or sequentially or to deposit mixtures of metals by using poly-phasic targets so that catalyst particles can be formed that comprise polyphasic nanoparticles, e.g., nanoparticles comprising atomic mixtures of say $M_1$ and $M_2$ (where $M_1$ and $M_2$ represent different metals), or that have combinations of metal nanoparticles for multi-function catalysts, e.g., nanoparticle mixtures comprising mixtures of discrete $M_1$ particles and discrete $M_2$ particles. In this fashion, catalyst particles can be prepared that can catalyze more than one reaction and these functions can be carried out simultaneously in practice. Thus, for instance, a catalyst particle can be prepared that will oxidize CO while at the same time oxidize $SO_2$ efficiently.

The PVD approach can efficiently deposit catalytically active metals on a wider range of support media, e.g., not only particles but also honeycombs, fibers, scrims, fabrics, paper, and the like. While fibers can be coated in the solution coating processes, the shear used to pulp and disperse the fibers in those processes generally results in dust formation and in inefficient coating due to the abrasion of the fibers during the coating process. PVD techniques are much more facile in this regard.

This PVD process allows catalytically active gold to be easily deposited onto supports containing carbon as well as on other oxidatively sensitive substrates. In the processes known in the art that require a heating step to affix and activate the catalyst particles, carbon in the presence of an oxidizing environment cannot adequately withstand the elevated temperatures that are often used. Thus, the carbon particles had to be treated in a reducing atmosphere since they would be attacked by oxygen during this heating step. Such a reducing step may undesirably reduce other catalyst constituents (e.g., as in the case of iron oxide supported on carbon or in porous carbon). In the instant invention, carbon particles and other non-oxide particles can be coated with catalyst nanoparticles and no heating step or post reduction is required. In this manner, high surface area carbon can be rendered catalytic for CO oxidation without losing the adsorptive properties of the porous carbon for the removal of other impurities from a gas stream.

The PVD approach can be used to coat very fine particles with catalyst wherein the fines are already coated on a larger host material. Alternatively, the PVD approach can be used to coat catalyst onto very fine particles before the fine particles are coated onto a second granular phase or other host or are thereafter formed into a porous granule. With either approach, the resultant composite provides high CO oxidation activity with low backpressure during use.

Physical vapor deposition preferably occurs under temperature and vacuum conditions in which the gold is very mobile. Consequently, the gold is quite mobile and will tend to migrate on the surface of the substrate until immobilized in some fashion, e.g., by adhering to a site on or very near the support surface. It is believed that sites of adhering can include defects such as surface vacancies, structural discontinuities such as steps and dislocations, interfacial boundaries between phases or crystals or other gold species such as small gold clusters. It is a distinct advantage of the invention that the deposited gold is immobilized effectively in a manner in which the gold retains a high level of catalytic activity. This is contrasted to those conventional methodologies in which the gold accumulates into such large bodies that catalytic activity is unduly compromised or even lost.

There are different approaches for carrying out physical vapor deposition. Representative approaches include sputter deposition, evaporation, and cathodic arc deposition. Any of these or other PVD approaches may be used, although the nature of the PVD technique used can impact catalytic activity. For instance, the energy of the physical vapor deposition technique used can impact the mobility, and hence tendency to accumulate, of the deposited gold. Higher energy tends to correspond to an increased tendency of the gold to accumulate. Increased accumulation, in turn, tends to reduce catalytic activity. Generally, the energy of the depositing species is lowest for evaporation, higher for sputter deposition (which may include some ion content in which a small fraction of the impinging metal species are ionized), and highest for cathodic arc (which may be several tens of percents of ion content). Accordingly, if a particular PVD technique yields deposited gold that is more mobile than might be desired, it may be useful to use a PVD technique of lesser energy instead.

Physical vapor deposition generally is a line of sight/surface coating technique between the gold source and the support. This means that only the exposed, outer surfaces of the support, but not the inner pores well within the substrate, are directly coated. Inner surfaces not in a direct line of sight with the source will tend not to be directly coated with gold. However, we have found by TEM analysis that after deposition on the surface of a porous substrate, the gold atoms can migrate by diffusion or other mechanism some moderate distance into the catalyst surface to provide nano-particles and gold clusters in the substrate pores in the region immediately adjacent to the surface before being immobilized. The average penetration into the porous substrates can be up to 50 nanometers in depth or sometimes greater, such as up to about 70 to about 90 nm in depth. In general though, the penetration depth is less than 50 nm and can be less than 30 nm. The gold penetration is very shallow compared to the typical support size.

The total thickness of the gold, or $C_t$, is equal to the gold penetration depth plus the thickness of the gold that is deposited on the surface of the substrate and that has not penetrated by diffusion. This total thickness is in general less than 50 nm and can often be less than 30 nm or even less than 20 nm. On materials having surface pores whose depth is greater than about 10 nm to 20 nm, the total gold thickness can appear to be greater than 50 nm since the gold layer follows the contours of the surface and the actual surface contour is reflected by the pore structure that it possesses. It is most preferred that the active gold species be collected on the outermost portion of the catalyst particle since this is the surface of the catalyst that interacts most readily with gaseous reactants.

The thickness of the gold shell region relative to the catalyst support particle size is quantified by the formula $$PDR = C_t/UST$$

wherein PDR is the penetration depth ratio, UST is the underlying support thickness or particle size and $C_t$ is the total thickness of the gold, as defined above. The underlying support thickness represents the size of the support as measured perpendicular to the catalyst surface and is usually indicative of particle size. The underlying support thickness may be determined by microscopic methods including optical microscopy or scanning electron microscopy. The value for $C_t$ may be determined by transmission electron microscopy in the case of thin films and high resolution scanning electron microscopy in the case of thicker films. The total thickness $C_t$ is very easily discerned from visual inspection of TEM data. Because of the uniformity by which gold is coated, a single representative TEM picture can be effective to characterize the coating. In practice, a sample may be effectively characterized via examination of a number of TEM pictures of catalyst surface cross-sections (vida infra) In preferred embodiments, PDR is in the range of from about $1 \times 10^{-9}$ to 0.1, preferably $1 \times 10^{-6}$ to $1 \times 10^{-4}$, indicating that the gold shell region is very thin indeed relative to total support thickness. As noted above, this generally corresponds to a penetration depth on the order of up to about 50 nm, preferably about 30 nm on preferred supports.

Characterization of the surface region and the gold bodies is accomplished using transmission electron microscopy as is well-known in the catalyst art. One method suitable for characterizing the catalytic surfaces is as follows: the catalyst particles are embedded in 3M Scotchcast™ Electrical Resin #5 (epoxy; 3M Company, St. Paul, Minn.) in disposable embedding capsules; resin is allowed to cure at room temperature for 24 hours.

For each sample, a random, embedded granule is trimmed (with a stainless steel razor blade previously cleaned with isopropyl alcohol) down to the middle surface region of the granule such that most of the granule is cut away on one side, leaving epoxy on the other side. A small trapezoid-shaped face (less than a half millimeter on a side) is selected and trimmed such that the epoxy/granule interface is left intact. The long direction of this interface is also the cutting direction. A Leica Ultracut UCT microtome (Leica Microsystems Inc., Bannockburn, Ill.) is used to cross-section the face. The face is first aligned such that the granule surface was perpendicular to the knife edge. Sections approximately 70 nm thick are cut at a speed of 0.08 mm/second. These sections are separated by floating onto deionized water and collected using a microtomy hair tool and picked up using a "Perfect Loop" (loop distributed by Electron Microscopy Sciences, Fort Washington, Pa.). Samples are transferred via this loop to a 3 mm diameter, 300 mesh copper TEM grid with carbon/formvar lacey substrate. The regions of interest (intact, cleanly cut specimens showing the interfacial region) that lie over the holes in the substrate are imaged and analyzed.

Images are taken at various magnifications (50,000× and 100,000×) in a Hitachi H-9000 transmission electron microscope (TEM; Hitachi High Technologies America, Pleasanton, Calif.) at 300 KV accelerating voltage using a Gatan CCD camera (Gatan Inc., Warrenton, Pa.) and Digital Micrograph software. Representative regions (regions selected wherein the interface of the catalytic surface is clearly displayed in a fashion perpendicular to the surface of the sample) are imaged. Calibrated markers and sample identifications are placed on each image. Numerous (>10) interfacial regions are examined.

An example of a TEM image of a cross-section of a representative catalyst surface of the present invention (material of example 3 of Assignee's Co-Pending Application cited above) is shown in FIG. 1. The gold nanoparticles can be seen to be both on the surface of the support and in the sub-surface region of the support. The region containing the gold nanoparticles is very thin and the gold deposition can be seen to follow the contours of the surface of the support.

As a consequence of line of sight coating, the resultant catalytically active material of the invention from one perspective may be viewed as nanoporous catalytic supports having relatively thin shells of discontinuous, catalytic gold on and proximal to their outer surfaces. That is, a resultant catalytically active material comprises a gold-rich shell region proximal to the surface and an interior region comprising negligible gold. In preferred embodiments, this gold-rich shell region comprises small (generally less than 10 nm, most preferably less than 5 nm), discrete gold bodies.

The inventive approach of forming a catalytically active shell region only on the surface of a nanoporous support is contrary to conventional wisdom when developing new catalytic material, and, therefore, the fact that the resultant material is so catalytically active is quite surprising. Specifically, the present invention puts catalytic functionality only near the surface of a highly porous support. Interior porosity is purposely unused. From a conventional perspective, it seems pointless to underutilize a nanoporous support in this manner. Knowing that catalytically active metal is to be deposited only at the support surface, the conventional bias might have been to use a nonporous substrate when depositing catalytically active gold onto a support. This is especially the case when PVD is not able to access the interior of the porous support in any event. The present invention overcomes this bias through the combined appreciation that (1) gold mobility is highly restricted on the surface of nanoporous supports, and (2) gold is still catalytically active even at very low weight loadings resulting from the surface coating approach. Consequently, using such supports is highly and uniquely beneficial in the context of depositing gold onto the surface region of a nanoporous support even though full catalytic capacity of the support is not utilized. For this reason, catalytically active gold is readily formed on composite supports (described further below) in which nanoporous "guest" particles are deposited onto "host" material, which itself may or may not be nanoporous.

Generally, physical vapor deposition preferably is performed while the support to be treated is being well-mixed (e.g., tumbled, fluidized, or the like) to help ensure that particle surfaces are adequately treated. Methods of tumbling particles for deposition by PVD are summarized in U.S. Pat. No. 4,618,525. For methods specifically directed at catalysts see Wise: "High Dispersion Platinum Catalyst by RF Sputtering," Journal of Catalysis, Vol. 83, pages 477-479 (1983) and Cairns et al U.S. Pat. No. 4,046,712. More preferably, the support is both tumbled or otherwise fluidized as well as comminuted (e.g., ground or milled to some degree) during at least a portion of the PVD process. This provides a degree of mechanical abrasion of the surface of the particles and generation of some fines during gold deposition. Our data suggests that catalytic performance is enhanced when deposition is carried out with comminution. It is our belief that these processes, i.e., the generation of fines and the mechanical interaction of the grits with each other, increases the activity of the resulting catalyst materials. While not wishing to be bound by theory, we believe that the fines provide higher surface area for higher activity. Fresh surface areas of the support are also exposed, and this might also enhance performance.

The impact of such comminution upon the resultant surface characteristics of the catalyst system was studied via TEM analysis. In the case of the gold on carbon containing the activating agents of the present invention, the TEMs reveal the presence of a unique, two phase structure believed to comprise nanoparticles and clusters of gold and carbonaceous material on the surface of the gold-coated particles. This nano-composite of gold/activation agent and carbon seems to possess a very high activity for catalysis of CO oxidation.

Such comminution, however, may not be desired in those embodiments in which gold is deposited onto composite supports fabricated from ingredients comprising guest and host material. Grinding tends to reduce the activity of these composite-based catalyst systems. In the case of composite structures containing titania guest material coated onto carbon host material, and without wishing to be bound, the reduced activity may be due to fines of carbon being generated and deposited on the titania. This tends to reduce the amount of gold/titania interfaces associated with higher activity.

An apparatus 10 for carrying out the preferred PVD process is shown in FIGS. 2 and 3. The apparatus 10 includes a housing 12 defining a vacuum chamber 14 containing a particle agitator 16. The housing 12, which may be made from an aluminum alloy if desired, is a vertically oriented hollow cylinder (45 cm high and 50 cm in diameter). The base 18 contains a port 20 for a high vacuum gate valve 22 followed by a six-inch diffusion pump 24 as well as a support 26 for the particle agitator 16. The chamber 14 is capable of being evacuated to background pressures in the range of $10^{-6}$ torr.

The top of the housing 12 includes a demountable, rubber L-gasket sealed plate 28 that is fitted with an external mount three-inch diameter dc magnetron sputter deposition source 30 (a US Gun II, US, INC., San Jose, Calif.). Into the source 30 is fastened a gold sputter target 32 (7.6 cm (3.0 inch) diameter×0.48 cm (3/16 inch) thick). The sputter source 30 is powered by an MDX-10 Magnetron Drive (Advanced Energy Industries, Inc, Fort Collins, Colo.) fitted with an arc suppressing Sparc-le 20 (Advanced Energy Industries, Inc, Fort Collins, Colo.).

The particle agitator 16 is a hollow cylinder (12 cm long× 9.5 cm diameter horizontal) with a rectangular opening 34 (6.5 cm×7.5 cm) in the top 36. The opening 34 is positioned 7 cm directly below the surface 36 of the gold sputter target 32 so that sputtered gold atoms can enter the agitator volume 38. The agitator 16 is fitted with a shaft 40 aligned with its axis. The shaft 40 has a rectangular cross section (1 cm×1 cm) to which are bolted four rectangular blades 42 which form an agitation mechanism or paddle wheel for the support particles being tumbled. The blades 42 each contain two holes 44 (2 cm diameter) to promote communication between the particle volumes contained in each of the four quadrants formed by the blades 42 and agitator cylinder 16. The dimensions of the blades 42 are selected to give side and end gap distances of either 2.7 mm or 1.7 mm with the agitator walls 48. Preferred modes of use of this apparatus are described below in the examples.

Physical vapor deposition may be carried out at any desired temperature(s) over a very wide range. However, the deposited gold may be more catalytically active if the gold is deposited at relatively low temperatures, e.g., at a temperature below about 150° C., preferably below about 50° C., more preferably at ambient temperature (e.g., about 20° C. to about 27° C.) or less. Operating under ambient conditions is preferred as being effective and economical since no heating or chilling requirements are involved during the deposition While not wishing to be bound by theory, it is believed that the deposition at lower temperatures yields more catalytically active gold for at least two reasons. First, lower temperatures yield gold with more defects in terms of geometrical size and/or shape (angularities, kinks, steps, etc.). Such defects are believed to play a role in many catalytic processes (see Z. P. Liu and P. Hu, *J. Am. Chem. Soc.*, 2003, 125, 1958). On the other hand, deposition at higher temperatures tends to yield gold that has a more organized and defect-free crystal structure and hence is less active. Additionally, deposition temperature can also impact gold mobility. Gold tends to be more mobile at higher temperatures and hence more likely to accumulate and lose catalytic activity.

The present invention provides catalytically active gold on the desired support(s) to form heterogeneous catalytic systems of the present invention. Gold is widely known as a noble, relatively inert metal with a yellowish color. However, the characteristics of gold change dramatically in nanoscale regimes, where gold becomes highly catalytically active. The high reactivity of gold catalyst in comparison with other metal catalysts is illustrated by reactions such as oxidation of CO under ambient conditions and reduction of NO, as well as epoxidation and hydrochlorination of unsaturated hydrocarbons.

In preferred embodiments, catalytically active gold may be identified by one or more requisite characteristics including size, color, and/or electrical characteristics. Generally, if a gold sample has one or more of these requisite characteristics, and preferably two or more of these characteristics, it will be deemed to be catalytically active in the practice of the present invention. Nanoscale size is a key requisite associated with catalytically active gold in that the catalytic activity of gold to a large degree is a function of whether the gold sample has a thickness dimension in the nanoscale regime (e.g., particle diameter, fiber diameter, film thickness, or the like). Bodies (also referred to as clusters in the literature) having smaller dimensions tend to be more catalytically active. As size increases, catalytic characteristics fall off rapidly. Accordingly, preferred embodiments of catalytically active gold may have a nanoscale size over a wide range, with smaller sizes more preferred when higher activity is desired. As general guidelines, catalytically active gold has particle or cluster dimensions in the range of from about 0.5 nm to about 50 nm, preferably about 1 nm to about 10 nm. Preferably, the gold has a size of no more than about 2 nm to about 5 nm in any dimension. The technical literature reports that catalytic activity may be a maximum at sizes in the range of from about 2 nm to about 3 nm. The size of the individual gold nanoparticles can be determined by TEM analysis as is well known in the art and as is described herein.

In terms of color, gold in larger scale size regimes has a yellowish color. However, in the nanoscale size regimes in which gold is catalytically active, the color of gold becomes a reddish-pink and then purplish-blue when viewed under white light, although very small clusters of gold and gold surface species can be colorless. Such colorless species can be quite catalytic, and the presence of such colorless species is usually accompanied by some colored nanoparticles of gold. Consequently, determining if the color of a gold sample includes a noticeable reddish-pink to purplish-blue component and/or is colorless indicates that it is possible that the sample is catalytically active.

The amount of catalytically active gold provided on a support can vary over a wide range. However, from a practical perspective, it is helpful to consider and balance a number of factors when choosing a desired weight loading. For instance, catalytically active gold is highly active when provided on nanoporous supports in accordance with the practice of the present invention. Thus, only very low weight loadings are needed to achieve good catalytic performance. This is fortunate, because gold is expensive. For economic reasons, therefore, it would be desirable not to use more gold than is reasonably needed to achieve the desired degree of catalytic activity. Additionally, because nanoscale gold is highly mobile when deposited using PVD, catalytic activity may be compromised if too much gold is used due to accumulation of the gold into large bodies. With such factors in mind, and as general guidelines, the weight loading of gold on the support preferably is in the range of 0.005 to 5 weight %, preferably 0.005 to 2 weight %, and most preferably from 0.005 to 1.5 weight % based upon the total weight of the support and the gold. When the support is a composite of 2 or more constituents, e.g., a composite formed by providing a plurality of one or more kinds of guest particles on one or more kinds of host particles, the total weight of the support refers to the total weight of the resultant composite.

Depositing catalytically active gold onto a support is very compatible with PVD techniques. Gold naturally sputters to form catalytically active, nanoscale particles and clusters onto the nanoporous support surface. It is believed that the gold is deposited mainly in elemental form, although other oxidation states may be present. Although gold is mobile and will tend to accumulate in low energy sites of the surface, the nanoporous characteristics of the support and the preferred use of activating agents in the practice of the present invention help to immobilize the gold, helping to keep the deposited gold clusters isolated and preferably discontinuous. This helps to preserve catalytic activity that might be otherwise compromised if the gold were to accumulate into larger sized bodies. As an alternative, very thin, gold films of nanoscale thickness may also be formed over some or all of the support surface if desired, keeping in mind that catalytic activity decreases with increasing film thickness. Even though such films may be formed with catalytic activity, discontinuous, isolated gold clusters tend to be much more catalytically active and are preferred in most applications.

Optionally, the heterogeneous catalyst system may be thermally treated after gold deposition if desired. Some conventional methods may require such thermal treatment in order to render the gold catalytically active. However, gold deposited in accordance with the present invention is highly active as deposited without any need for a thermal treatment. Indeed, such gold can very effectively catalytically oxidize CO to form $CO_2$ at room temperature or even much cooler. Additionally, depending upon factors such as the nature of the support, the activating agents, the amount of gold, or the like, catalytic activity can be compromised to some degree if thermally treated at too high a temperature. Indeed, for some modes of practice in which the heterogeneous catalyst system is intended to be used in a heated environment, e.g., an environment having a temperature higher than about 200° C., the catalytic activity of the system should be confirmed at those temperatures.

It is also believed that low-coordination gold in catalytic nanoparticles is beneficial. Low coordination gold refers to $Au_n$ for which n on average is in the range of 1 to 100, preferably about 2 to 20. Without wishing to be bound by theory, we propose that the catalytic activity of the very small clusters of gold is associated at least to some degree with low-coordination defects, and that these defects are able to provide sites for storing charges which may be transferred from underlying supports and/or other sources. Accordingly, with such defects and mechanism in mind, it is preferred that heterogeneous catalysts of the invention include one or more of the following features: (a) The gold and hence the defects are located mainly on the surface of the underlying support; (b) The average value for n is greater than about 2; and (c) as much as is practically possible, gold clusters are isolated but nonetheless close to each other (within a distance of about 1 nm to about 2 nm or less). While such features may be associated with smaller sized gold clusters, it is possible that such characteristics may be found mainly at steps or edges of larger clusters.

In addition to gold, one or more other catalysts could also be provided on the same supports and/or on other supports intermixed with the gold-containing supports. Examples include one or more of silver, palladium, platinum, rhodium, ruthenium, osmium, copper, iridium, or the like. If used, these may be co-deposited onto the support from a target source that is the same or different than the gold source target. Alternatively, such catalysts may be provided on the support either before or after the gold. Other catalysts requiring a thermal treatment for activation advantageously may be applied onto the support and heat treated before the gold is deposited. In certain cases catalysts such as Rh, Pd and Pt can be deposited according to the present invention and utilized as catalysts without the presence of gold.

In the practice of the present invention, catalytically active gold is deposited onto one or more supports that are nanoporous. We have found that surface deposition/coating of catalytically active metal onto the nanoscale topography of nanoporous media provides catalyst systems with excellent performance. In the case of gold, for example, it appears that these nanoscale features help to immobilize the gold, preventing gold accumulation that might otherwise result in a loss of performance.

Nanopores can be observed and nanopore size can be measured via transmission electron microscopy. The nanoporous nature of a support may also be characterized by a technique such as described in ASTM Standard Practice D 4641-94 in which nitrogen desorption isotherms are used to calculate the pore size distribution of catalysts and catalyst supports in the range from about 1.5 to 100 nm. Nanoporous means that the total nanoporous capacity for pores in the size range of 1 to 10 nm is greater than 20% (i.e., greater than about 0.20 using the formula below) of the total pore volume of the support material in the range from 1 to 100 nm as calculated using the following formula with data obtained from ASTM D4641-94, the entirety of which is incorporated herein by reference:

$$NPC = \frac{CPv_1 - CPv_{10}}{CPv_1 - CPv_{100}}$$

wherein NPC refers to the nanoporous capacity; $CPv_n$ refers to the cumulative pore volume at pore radius n in $cm^3/g$; and n is the pore radius in nanometers.

The nanoporous characteristic of the support helps to immobilize gold clusters on the support surface. This stabilization of the very small gold particles and clusters is evidenced by both the direct observation of smaller particles of gold in TEM studies of materials possessing nanoporous surfaces and in higher catalytic activity as measured by the ability of the catalyst to convert CO to $CO_2$ in the presence of air.

The nanoporous characteristic of the support helps to immobilize gold clusters on the support surface. This stabilization of the very small gold particles and clusters is evidenced by both the direct observation of smaller particles of gold in TEM studies of materials possessing nanoporous surfaces and in higher catalytic activity as measured by the ability of the catalyst to convert CO to $CO_2$ in the presence of air. Advantageously, gold is also readily deposited onto nanoporous supports using PVD in a catalytically active state without requiring additional thermal or other treatment for activation. In addition to nanoporosity, the substrate particles optionally may further have microporous, mesoporous, and/or macroporous characteristics as such are defined in applicable provisions of IUPAC Compendium of Chemical Technology, 2d edition (1997). A typical population of activated carbon or alumina support particles will tend to include a combination of nanoporous, microporous, mesoporous, and macroporous properties.

It is important to note that the support materials only need be nanoporous in the exterior surface region of the support at a depth equal to or greater than the penetration depth of the gold atoms in the present invention. Thus, the present invention includes methods whereby normally low surface area, non-nanoporous materials can be made to possess exterior surfaces characterized by nanoporosity. These methods include adsorption of nanoporous materials such as gels and nanoparticle size colloids on the surface of a larger, host material to form a composite with the desired nanoporosity; hydrolysis of metal alkoxides or metal salts on the surface of a material to form the nanoporous materials; and oxidation of a thin coating of metal, e.g., aluminum, titanium, tin, antimony or the like, on the surface of a material to form a nanoporous material. In the latter case, the thin metal films can be deposited by physical vapor methods and the oxidation can be carried out by dry or moist air to produce a nanoparticle film on the substrate.

The support(s) may be used in various shapes or combinations such as, for example, powder, particle, pellet, granule, extrudate, fiber, shell, honeycomb, plate, or the like. The particles can be regular in shape, irregular, dendritic, dendrite-free, or the like. Preferred supports are particulate in nature or powders.

Particulate embodiments of support media may have any of a wide range of sizes. Support particle size generally may be expressed in terms of a mesh size. A typical expression for mesh size is given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Support particles characterized by a mesh size of 12×30 would include a population of particles having a diameter in the range from about 0.5 mm to about 1.5 mm.

Selecting an appropriate mesh size for the substrate particles involves balancing density and catalytic rate against air flow resistance. Generally, a finer mesh size (i.e., smaller particles) tends to provide not only greater catalytic rate and filter capacity, but also higher air flow resistance. Balancing these concerns, "a" is typically in the range of 8 to 12 and "b" is typically 20 to about 40 with the proviso that the difference between a and b is generally in the range from about 8 to about 30. Specific mesh sizes found to be suitable in the practice of the present invention include 12×20, 12×30, and 12×40.

In addition to nanoporosity, support media of the present invention preferably further include one or more additional characteristics. For instance, preferred embodiments of the support media are characterized by multiphasic, e.g., biphasic, surfaces. Multiphasic means that the surface has more than one phase. Our data show that catalytic activity is enhanced when gold is deposited onto a multiphasic surface. While not wishing to be bound, it is believed that the resultant phase boundaries on the surface appear to help stabilize gold. TEM studies as described herein and as is well known in the art can be used to assess whether a surface is biphasic. It is believed that these phase boundaries are very finely dispersed at the nanoscale, helping to make the boundaries effective for immobilizing gold.

A wide variety of materials may serve as suitable supports in the practice of the present invention. Representative examples include carbonaceous materials, silicaceous materials (such as silica), metal compounds such as metal oxides or sulfides, combinations of these, and the like. Representative metal oxides (or sulfides) include oxides (or sulfides) of one or more of magnesium, aluminum, titanium, vanadium, chromium, manganese, cobalt, nickel, copper, zinc, gallium, germanium, strontium, yttrium, zirconium, niobium, molybdenum, technetium, ruthenium, rhodium, palladium, silver, cadmium, indium, iron, tin, antimony, barium, lanthanum, hafnium, thallium, tungsten, rhenium, osmium, iridium, and platinum.

Examples of carbonaceous substances include activated carbon and graphite. Suitable activated carbon particles may be derived from a wide variety of source(s) including coal, coconut, peat, any activated carbon(s) from any source(s), combinations of at least two of these, and/or the like.

Preferred embodiments of support media may be selected from aluminum oxides, titania, titania-alumina, activated carbon, binary oxides such as hopcalite ($CuMnO_2$), molecular sieves, and/or the like. Of these, alumina, titania and activated carbon are particularly preferred support materials. Activated carbon, titania and alumina are found in forms having nanoporosity and therefore, these forms are preferred support materials. Activated carbon is advantageous because in addition to providing a support for catalytic activity, the carbon also functions as an absorbent for noxious gases. Additional impregnants that augment filtering capabilities are also easily incorporated into carbonaceous material in accordance with conventional practices (described further below). Activated alumina also is a preferred support material, as it is very robust to aging and heat. Generally, catalyst systems of the present invention are advantageously made from ingredients comprising an alumina support when the catalyst system will be used at elevated temperature. Otherwise, supports comprising activated carbon are preferred in many embodiments, as these generally have longer service lives.

A particularly preferred support is a composite that may be prepared by adsorbing or adhering fine (less than 100 micrometers, preferably less than 50 micrometers and most preferably less than 10 micrometer) nanoporous particles onto larger material, fibers, honeycomb material, combinations of these, and the like. The relatively fine material is referred to herein as "guest" material, while the relatively larger support material is referred to herein as "host" material. As one alternative, catalytically active gold may be deposited onto the guest material before the guest material is combined with the host material. As another alternative, catalytically active gold may be deposited onto the resultant composite material during or after the composite material is formed.

This guest/host composite structure provides dramatically higher total exterior surface area while retaining the desirable gas passing characteristics, i.e., low pressure drop, of a coarser particle. In addition, by using nanoporous, smaller particles in constructing these composite particles, inexpensive, non-nanoporous, coarser particles can be used. Thus, very inexpensive, highly active catalyst particles can be prepared since the bulk of the volume of a catalyst bed is taken up by the inexpensive, underlying, coarser particles.

A variety of methods generally may be used to construct the composite support media. In one method, nanoporous, guest particles are admixed with one or more adhesion agents in solution and then this mixture is combined with coarser host particles. If the coarser particle is porous, the small particle-adhesion agent solution mixture can be introduced by incipient wetting of the porous larger particle. If the larger particle is not porous, the small particle-adhesion agent solution mixture can be admixed with the coarser particles and the solution liquid can be removed either concurrent with the mixing or subsequent to the mixing. In either case, after combining the nanoporous, small particle size material, the adhesion agent and the coarser particles and removing the liquid from the solution, the mixture is dried and optionally calcined or otherwise heat treated to provide a composite particle having the smaller, nanoporous particles adhered on the surface of a coarser particle. The calcining temperature is selected to be below the temperature at which the nanoporous particles lose porosity. Generally the calcining temperature will be in the range of about 200° C. to about 800° C. In general, a low temperature is preferred. The sample is heated sufficiently to generate a bond between the adhesion agent and the particles but not high enough to significantly alter the nanoporous nature of the coating. The adhesion agent generally is included at an amount of 0.1 to about 50 parts by weight based upon 100 parts by weight of the guest material. Examples of adhesion agents include basic metal salts, partially hydrolyzed metal complexes such as partially hydrolyzed alkoxides, hydrous metal oxy-hydroxide nanoparticles, and other metal salts. Samples containing carbon, though, generally are heated at more moderate temperatures, e.g., 120° C. to 140° C. As another construction method for making composite support media, guest particles can be adhered to the host particles using partially hydrolyzed alkoxide solutions, basic metal salt solutions, or nanoparticle sized colloidal metal oxides and oxy-hydroxides as an adhesion agent. Partially hydrolyzed alkoxide solutions are prepared as is well known in the sol-gel art. Useful metal alkoxides include alkoxides of titanium, aluminum, silicon, tin, vanadium and admixtures of these alkoxides. Basic metal salts include nitrate and carboxylate salts of titanium and aluminum. Nanoparticle size colloidal materials include colloids of oxides and oxy-hydroxides of aluminum, titanium and oxides of silicon, tin, and vanadium.

As an alternative construction method, guest-host composites can be prepared by physically mixing guest and host materials. This can occur by techniques involving mechanical and/or electrostatic mixing. As a consequence of this mixing, the guest and host components tend to become associated into desired ordered mixtures in which guest material substantially uniformly coats or is otherwise associated with the surfaces of the host material. Optionally, one or more liquid ingredients may be included in the ingredients used to make an ordered mixture, although dry blending with little or no solvent can provide suitable composites. Although not wishing to be bound, it is believed that the guest material may physically, chemically, and/or electrostatically interact with the host material to form the ordered mixture. Ordered mixtures and methods of making such mixtures has been described in Pfeffer et al., "Synthesis of engineered Particulates with Tailored Properties Using Dry Particle Coating", Powder Technology 117 (2001) 40-67; and Hersey, "Ordered Mixing: A New Concept in Powder Mixing Practice", Powder Technology, 11 (1975) 41-44, each of which is incorporated herein by reference.

Preferably, one or more kinds of nanoporous guest particles are present in nanoparticulate form and independently may have a median particle size in the range of from about 3 nm to about 35 nm, more preferably about 3 nm to about 15 nm, and most preferably about 3 nm to about 8 nm. The guest particles preferably have a high surface area as measured by BET. The surface area is preferably greater than about 50 $m^2/g$, more preferably greater than about 150 $m^2/g$. and most preferably greater than about 300 $m^2/g$.

The guest particles may be present in the form of nanoporous aggregates of nanoparticles. These nanoporous aggregate particles may have a median particle size in the range of from about 0.2 micrometers to about 3 micrometers, more preferably in the range of about 0.2 micrometers to about 1.5 micrometers, and most preferably in the range of about 0.2 micrometers to about 1.0 micrometers.

The guest particles and/or aggregated guest particles provide a nanoporous, exposed, high surface area coating on the host particles for the vapor deposition of gold.

Figure 7:
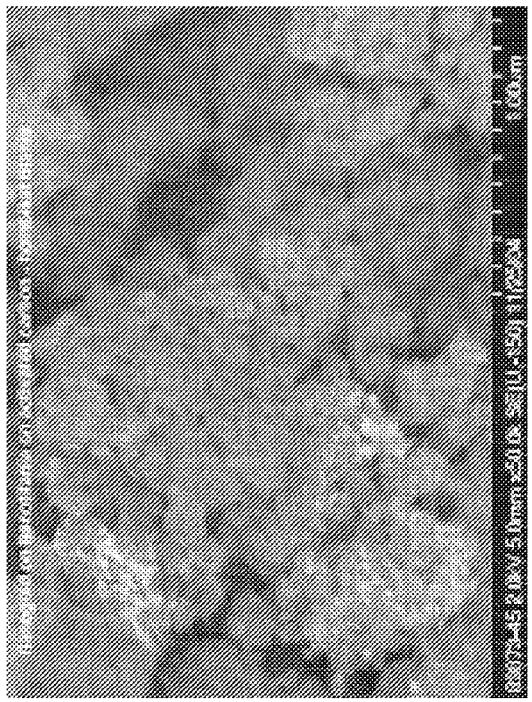
FIG. 7 shows an SEM of a composite particle of the invention in which nanoporous titania particles and aggregates thereof are coated onto carbon host particles.
Figure 6:
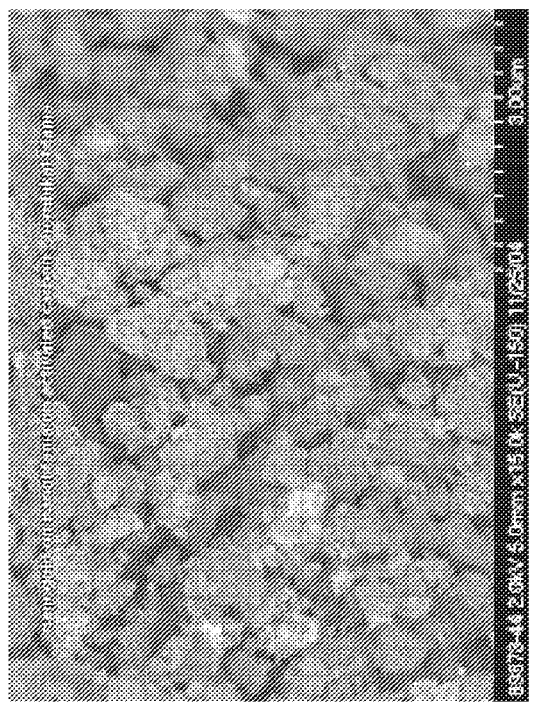
FIG. 6 shows an SEM of a composite particle of the invention in which nanoporous titania particles and aggregates thereof are coated onto carbon host particles.
Figure 8:
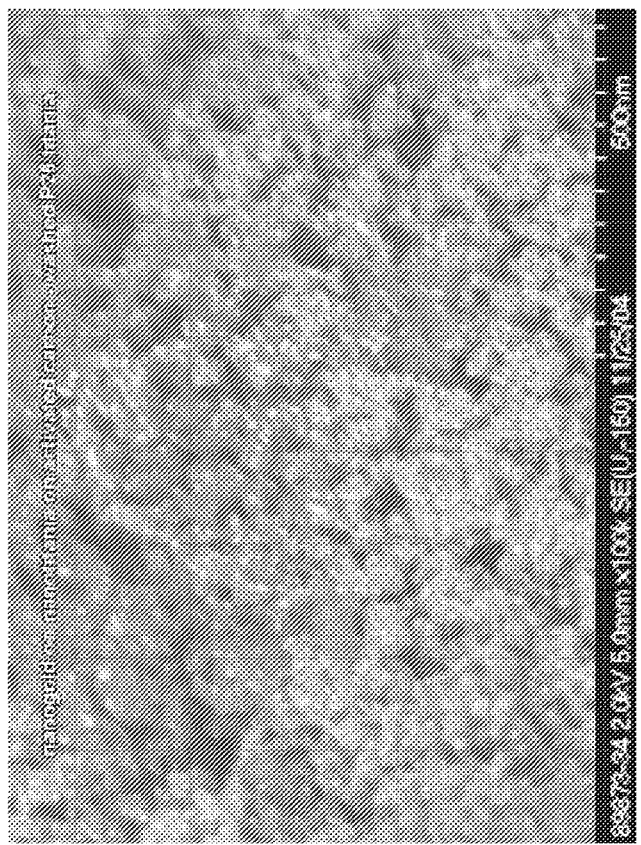
FIG. 8 shows an SEM of a composite catalyst of the invention in which nanoporous titania particles and aggregates thereof are coated onto carbon host particles, wherein gold has been deposited on the titania using PVD techniques.

As shown in FIGS. 6 and 7, the SEM images of guest/host embodiments comprising titania particles and titania aggregates coated as guest material onto carbon host particles show porosity on multiple levels. FIG. 8 shows gold deposited on such particles using PVD techniques to deposit the gold.

In embodiments in which the host material includes particulate constituents, the one or more kinds of host particles are larger than the guest material being used and typically independently may have a median particle size in the range of from 3 micrometers to about 1000 micrometers, more preferably in the range of about 5 micrometers to about 500 micrometers. However, larger host particles may be used in some applications. Within such ranges, it is also desirable that the relative sizes of the host and guest particles are suitable for forming an ordered mixture. Thus, it is preferred that the ratio of the volume average particle size of the host particles to the guest particles is greater than about 3:1, more preferably greater than about 10:1, and more preferably greater than about 20:1.

Particle size may be measured in any appropriate manner in accordance with conventional practices now or hereafter practiced. According to one approach, particle size may be determined by inspection of TEM information. Preferably, particle size measurements are made using a laser light diffraction particle size analyzer (such as a Malvern Mastersizer X) using a dry powder feeder module. The measurement from this technique reports a particle size distribution curve, expressed in terms of the volume of equivalent spheres. The numbers reported are diameters of spheres having a volume equivalent to the calculated volume of the particles being measured. The D10, D50, and D90 values, for instance, may be determined from the information embodied in the distribution curve. D10 value refers to the diameter such that 10% of the area of the distribution curve is equal to or smaller than that value. Values for D50 and D90 are determined in an analogous manner for 50% and 90%, respectively. Throughout this specification, a reference to particle size refers to the D50 (average particle size) unless otherwise expressly noted.

A variety of materials may be used as the host material, either singly or in combination, in composite support media of the present invention. Examples include a wide range of materials such as particles, powder, pellet, granule, extrudate, fiber, shell, honeycomb, plate, combinations of these, and the like. The particles can be regular in shape, irregular, dendritic, dendrite-free, or the like. Because the composite will further incorporate nanoporous guest material in preferred embodiments, the host material need not be, but can be if desired, nanoporous. Particulate embodiments of host material include alumina, activated carbon, alumino-silicates, silicates, transition metal oxides, combinations of these and the like. Alumina and activated carbon are preferred.

A preferred embodiment of host particles includes an activated carbon commercially available under the trade designation "Kuraray GG" from Kuraray Chemical Co., Ltd. (Japan). This material is nanoporous and mesoporous. The material contains potassium carbonate but is low in halide content. The material is derived from coconuts.

Guest material of the present invention preferably comprises nanoporous particles or powders that can coat or otherwise become associated with all or a portion of the surfaces of the host material via physical, chemical, electrostatic adhesion, or other means. Representative examples of guest particles include titania (preferably wherein at least a portion of the titania is in the anatase crystalline form); zinc oxide; ceria; iron oxide; alumina; tin oxide, silicon oxide; sol-gel-derived small particles; nanoporous, fine particle size zeolite; high surface area aerogel particles; combinations of these; and the like. Titania is preferred.

In preferred embodiments, composite catalyst particles of the present invention are coated onto at least a portion of the surfaces of filtration media arrays such as those described in U.S. Pat. No. 6,752,889 (the entirety of which is incorporated herein by reference) or as commercially available under the trade designation 3M High Air Flow (HAF) filters from 3M Company, St. Paul, Minn. These media generally include a plurality of open pathways, or flow channels, extending from one side of the media to the other. Even though the composite catalyst particles might only coat the surfaces of these channels, leaving large open volumes through the channels for air streams to pass, it has been found that substantially all CO in air streams passing through the media nonetheless is catalytically oxidized with virtually no pressure drop. Most preferably, the composite catalyst particles of this embodiment are formed from titania guest particles coated onto carbon host particles (such as the Kuraray GG activated carbon particles). The catalytically active gold may be deposited onto the titania particles before the composite particles are assembled. Alternatively, the gold can be deposited onto the assembled composite particles.

Heterogeneous catalyst systems of the present invention optionally may incorporate one or more activating agents to enhance catalytic performance of the system. As used herein, an activating agent generally refers to any ingredient that is generally not catalytic by itself yet can enhance the performance of a catalyst when both the activating agent(s) and the catalyst are incorporated into the system. In preferred embodiments, the activating agent(s) may be incorporated into the desired support before, during or after gold deposition. Preferably, this incorporation occurs prior to gold deposition. In the case of composite support materials comprising guest material provided on host material, the activating agent (s) may be incorporated into the host material and or the guest material.

One preferred class of activating agents of the present invention includes one or more metal salts. Water soluble salts such as alkali metal salts and/or alkaline earth metal salts are inexpensive, readily available, and easily incorporated into catalytic systems when practicing the present invention. Significantly, it has been discovered that these salts are potent activators for gold-based catalysis, especially when used to activate nanoporous carbon support media. Bifurcating PVD deposition of catalytically active gold from earlier activation of the support media was a key to help enable this advance in the use of carbon media supports with activating salts for gold-based catalysis.

Clearly, the use of such a metal salt enhances catalytic performance, but the exact mechanism by which performance is enhanced is not known for certain. Without wishing to be bound, it is believed that the metal cation reacts with the surface of the support in a manner that helps to immobilize gold (e.g., by providing a multiphasic surface) and/or that the metal cation functions as an electron acceptor or participates in some fashion in the catalytic reaction sequence. The metal cation may also provide water adsorption sites to provide water to enhance the catalytic reaction.

Examples of metal salts include salts of the alkali or alkaline earth metals such as lithium, potassium, sodium, magnesium, calcium, and/or barium. Other metals include Cs, Rb, and the like. Combinations of any of these metal salts may be used. In some embodiments, the activating agent comprises at least one alkali metal salt and at least one alkaline earth metal salt, wherein the weight ratio of the alkali metal salt to the alkaline earth metal salt is in the range of about 1:19 to about 19:1, preferably about 1:3 to about 3:1.

The metal salts can include any suitable counter anion(s). Examples include nitrate, hydroxide, acetate, carbonate, combinations of these, and the like. Either carbonate or hydroxide is an especially preferred anion as it is safe and convenient to handle and forms very active supports. If the nitrate anion is included, the substrate desirably is calcined to a sufficiently high temperature to decompose the nitrate anion to activate the support. Carbonate is even more effective when used in combination with an alkali metal or alkaline earth metal. Accordingly, preferred activating agents of the invention comprise a carbonate salt, and more preferably an alkali metal carbonate salt or an alkaline earth metal carbonate salt.

Potassium carbonate is very effective, for example, especially when used on activated carbon with a gold catalyst, but it is also effective in systems with other types of supports, e.g., alumina, as well. The fact that potassium carbonate activates a carbon-gold system is quite surprising. Firstly, depositing gold onto $K_2CO_3$ in the absence of the carbon or other nanoporous support provides a system with very low, if any, catalytic activity. Further, depositing gold on activated carbon in the absence of the $K_2CO_3$ also provides a system with very low, if any, catalytic activity. Yet, when the three ingredients are combined, a very effective catalyst system results. Indeed, discovering such a simple and effective way to make activated carbon as a support for catalytically active gold is a significant accomplishment. The benefits of the carbonate is highlighted by data showing that potassium sulfate is a poor activating agent, although it is believed that its performance would improve if a support impregnated with potassium sulfate were to be thermally treated prior to gold deposition.

Yet, potassium carbonate and many of the other salts mentioned herein are very soluble in aqueous solution. Depositing the gold onto the substrate via PVD allows systems containing both gold and such activating materials to be easily made. Water soluble activators such as $K_2CO_3$ cannot be used with conventional aqueous impregnation or precipitation methods. This is because they would dissolve in and be washed from the support medium by the water solvents.

Another advantageous class of activating agents includes alkoxide materials, especially those described above with respect to forming nanoporous surface features on less porous host particles. Preferred alkoxides include alkoxides of Ti and Al. Alkoxide materials are advantageously used in combination with one or more of the water soluble salt materials described above. When the two kinds of materials are used together, they can be impregnated onto the support at the same time or sequentially in any order, although it is preferred that the alkoxide material(s) be impregnated onto the support after the impregnation of the salt(s). In a representative process, the water soluble salt is impregnated onto the support, and the support is then dried and optionally calcined. Next, the alkoxide is impregnated onto the guest particle, the product is hydrolyzed, dried, and optionally calcined. Thus, prepared, gold is then deposited onto the activated support.

Use of an alkoxide as an impregnant/activating agent appears to change the crystalline structure of the support in our TEM studies. Specifically, the grain structure of the support proximal to the support surface appears to be much finer than the core region and much finer than otherwise identical systems prepared without the alkoxide. The structure modification penetrates in most instances further into the support than the gold, e.g., 50 nm or more. In some instances, the boundary between the modified surface region and the unmodified core region is easily observed.

Not all alkoxides may work in all conditions. For example, Ti and Al alkoxides were found to enhance catalytic performance when incorporated into catalyst systems as shown in the examples. However, substituting a Zr-based alkoxide into these formulations did not demonstrate any enhancement in the ability of the system to oxidize CO.

In a similar fashion, some water soluble salt activating agents, particularly sulfates, oxalates, and phosphates, did not demonstrate activating performance in some of our studies, although it is believed that calcining the impregnated support could improve performance of at least the sulfates and oxalates. While not wishing to be bound, it is believed that these kinds of anions, which tend to be coordinating, impact support surface charges in a manner that impairs the ability of the surface to immobilize gold. Yet, sulfate and oxalate anions are readily decomposed at reasonable calcining temperatures, which explains why we believe that calcining would enhance the activating characteristics of these materials.

Iron salts also are poor candidates for use as the only activating agent when PVD techniques are used to deposit gold. This is unexpected, inasmuch as iron salts are effective activators when gold is impregnated onto particles via solution processing. This shows that ingredients that readily work in one context, e.g., solution processing, may not work the same in another context, e.g., PVD processing.

Likewise, not all porous supports are readily activated under the same conditions that work with other support media. For instance, certain zeolites, e.g., sodium Y zeolites form poor support media when processed in ways that are effective for alumina, carbon, silica, hopcalite, etc. Even when activated with a salt, low or no catalytic activity for CO oxidation was observed when procedures that worked for alumina were applied to zeolite media. Zeolites are known to have more ordered structures and to not possess the defects of other oxides. Silicalite, the aluminum-free form of ZSM-5-type zeolite, was found to work well in the present invention. Thus, for certain zeolite materials to be used as support media, they are preferably surface treated in some fashion to enhance the ability of the surface to immobilize gold.

The amount of activating agent used in the heterogeneous catalyst system can vary over a wide range and will depend upon a variety of factors including the nature of the activating agent, the amount of gold to be incorporated into the system, the nature of the support, and the like. Generally, if too little activating agent is used, the potential benefits of using the activating agent may not be fully attained. On the other hand, beyond some point, using additional activating agent may not provide significant additional benefit and may undermine catalytic performance to some degree. Accordingly, as suggested guidelines, representative embodiments of the invention may include from 0.25 to 15, preferably 1 to 5 weight percent of activating agent based upon the total weight of activating agent and the support. When one or more water soluble salts and one or more alkoxide materials are used in combination, the molar ratio of the salt(s) to alkoxide(s) ingredient(s) is in the range of 1:100 to 100:1, preferably 1:5 to 5:1.

The activating agent may be incorporated into the heterogeneous catalyst system in a variety of different ways. In some instances, the support to be used may inherently include a suitable activating agent. For example, activated carbon derived from coconut shell naturally includes potassium carbonate as a constituent. This kind of activated carbon provides an excellent support for gold catalyst without requiring additional activating ingredients.

We have demonstrated the benefit of using activated carbon from coconut husk as well as the benefit of using potassium carbonate as an activating agent. Kuraray GC carbon and Kuraray GG carbon are both derived from coconut shells. Kuraray GG carbon is the natural, resultant carbon that includes potassium carbonate. Kuraray GC carbon is similar except that it has been acid washed and then extensively rinsed with water to remove the potassium carbonate and other acid and water soluble constituents. When gold is deposited onto these two carbons using PVD, the system derived from Kuraray GG carbon (includes the potassium carbonate) is a very good catalyst for CO oxidation, especially under more humid conditions. On the other hand, the system derived from Kuraray GC carbon (essentially no potassium carbonate) has low activity for CO oxidation in dry or humid environments. Further, if the Kuraray GG carbon is washed to remove the potassium salt, catalytic functionality of the resultant system is significantly compromised. Catalytic activity can be recovered again if the washed Kuraray GG carbon is impregnated with an activating agent prior to gold deposition, especially if the impregnated carbon is thermally treated (described further below) prior to gold deposition.

TEM (transmission electron micrograph) examination of the gold deposited on Kuraray GG carbon particles by physical vapor deposition showed the presence of nanoparticles and protodots (protodots being the very small clusters of gold) both on the immediate surface of the support and in pores immediately adjacent to the support surface. As could be seen in the transmission electron micrograph, the gold was present in both nanoparticle and in very small cluster forms. The gold particles formed preferentially in small grooves and fissure-like pores in the carbon as evidenced by the orientation of the gold particles in linear, necklace-like patterns on the surface of the carbon. The dark field image of the same region showed the gold-enriched striations clearly. The uniformity of the gold deposition could be clearly seen on the TEM images. The gold clusters that were observed by TEM were as small as 1 nm or less and as large as about 5 nm. The gold rich grooves or striations were as wide as about 7 nm and as long as about 50 to 100 nm. There were also gold-rich domains comprising exceedingly fine gold arrays that appear as veil-like bright regions in the dark field image. It is unknown why these regions, although quite crystalline in character, did not coalesce into single crystals of gold.

Although not wishing to be bound by theory, a possible explanation for the performance of potassium carbonate is that potassium carbonate provides sites where water can adsorb. Indeed, in certain cases we have found that the gold catalysts are more active in the presence of moisture.

Unlike Kuraray GG carbon, many other desirable supports do not naturally include an activating agent. Consequently, in some instances, it may be desirable to incorporate an activating agent comprising one or more constituents into the desired support. Such incorporation can occur in any desired manner. Incipient wetness impregnation is one suitable technique, and examples of using solution impregnation are described in the examples below. Briefly, incipient wetness impregnation involves slowly adding a solution comprising the desired activating agent to dry support particles with mixing. The solution generally is added until saturation, and adding an excess of solution is desirably avoided. Such solutions typically are aqueous and the concentration of each species of activating agent in the solution generally is in the range of from about 0.2 M to about 1.0 M. If more than one species of activating agent is to be added, these may be added together, separately, or in overlapping fashion. After impregnation, the particles are dried and optionally calcined (thermal treatment).

In any embodiments of the invention, the catalyst system may further incorporate one or more agents to enhance the filtering capabilities of the system. In many embodiments, such agents are in the form of one or more impregnants that may be incorporated into the nanoporous support medium. In those embodiments wherein the nanoporous support medium has a guest/host composite structure, such impregnants may be incorporated in the guest and/or host material. Most preferably, particularly when the host comprises a carbonaceous material such as activated carbon particles, the impregnants are incorporated at least into the carbonaceous material.

Examples of impregnants include one or more metals, metal alloys, intermetallic compositions, and/or compounds containing one or more of Cu, Zn, Mo, Cr, Ag, Ni, V, W, Y, Co, combinations thereof, and the like. However, because the hexavalent form of Cr has been identified as a potential carcinogen, the catalyst system of the present invention preferably includes no detectable amounts of Cr (VI), and more preferably no detectable Cr of any valence state due to the risk that other forms of Cr, e.g., Cr(IV) could be oxidized to Cr(VI). The metals typically are impregnated as salts and can be converted to other forms, e.g., oxides perhaps, during some modes of impregnation.

The selection of which one or more transition metal compounds to incorporate into the catalyst system depends upon the desired range of filtering capabilities inasmuch as each of the various transition metals tend to provide protection against particular air contaminants. For example, Cr, Mo, V, and Y or W independently help to filter gases such as cyanogen chloride and hydrogen cyanide from air streams when used in combination with a Cu impregnant. Representative catalyst system particles may include 0.1 to 10 weight percent of one or more impregnants including Mo, V, W, and/or Cr. Due to the potential toxicity of Cr, the use of Mo, V, and/or W materials are preferred. Throughout this specification and accompanying claims, weight percent with respect to impregnants is based upon the total weight of the impregnated particles unless otherwise noted.

Cu tends to help filter many gases such as HCN, $H_2S$, acid gases, and the like from air streams. Representative filter media particles may include 0.1 to 15 weight percent of one or more impregnants including Cu.

Zn in various forms tends to help filter HCN, cyanogen chloride, cyanogen, and $NH_3$ from air streams. Representative filter media particles of the present invention may include 1 to 20 weight percent of one or more impregnants including Zn.

Ag tends to help filter arsenical gases from an air stream. Ag functions catalytically and generally is not consumed during filtering operations. Accordingly, filter media particles may include relatively small catalytic amounts, e.g., about 0.01 to 1, preferably 0.1 weight percent, of one or more Ag-containing impregnants.

Ni and Co each independently helps to filter HCN from air streams. Representative filter media particles may include 0.1 to 15 weight percent of one or more Ni containing impregnants and/or Co containing impregnants.

In addition to one or more impregnants that contain transition metals, the first plurality of substrate particles may optionally include one or more other kinds of impregnants. For example, ammonia or ammonium salts in the impregnating solution not only help to improve the solubility of transition metal compounds during the manufacture of the particles, but remaining adsorbed quantities also help to remove acid gases from air streams. Sulfate salts are believed to help to control the pH during usage of filter media. Ammonium sulfate, for instance, when impregnated on a substrate such as carbon and dried at 145° C. forms an acid sulfate. Acid sulfate is sufficiently acidic to react with ammonia to facilitate removal of ammonia from a flow of air or other gas. Through impregnation and drying, strongly acidic ammonium salts impregnate the carbon during the drying process without damaging the basic oxide/hydroxide impregnant being formed. This results in enhanced ammonia service life of a cartridge containing the resultant impregnated carbon. Representative filter media particles may include 0.1 to 10, preferably 2.5 to 4.5 weight percent of sulfate.

Moisture beneficially helps to remove acid gases from air streams. Optionally, therefore, the first plurality of filter media particles may include up to about 15 weight percent, preferably about 6 to 12 weight percent of water.

Impregnants may be incorporated into the catalyst system in accordance with conventional practices. Such impregnants are typically provided as salts, oxides, carbonates, or the like and are impregnated via solution processing, sublimation processing, fluidized bed processing, and the like. Preferably, such impregnation occurs prior to gold deposition. Representative techniques for such processing have been widely described in the literature, including the patent and literature documents cited in the Background section herein.

Deposition of gold preferably occurs via PVD after impregnation, coating of host material or structures with at least one guest material (with respect to host/guest composite structures when used), drying, and optional calcining Bifurcation of impregnation and gold deposition is a distinct advantage for many reasons. First, if the gold were to be added to the particles via solution impregnation, the kinds of activating agents that could be used would be limited. For instance, $HAuCl_4$, a gold species commonly used in solution methods because of its relatively low cost, is very acidic making it incompatible with basic activating agents such as the preferred alkali and alkaline earth metal salts. In cases where basic gold species are used, the aqueous impregnation would tend to wash away some of the desired activating ions. Thus, subsequent deposition of gold via PVD (a non-solution process) separate from impregnation with activating agents is a significant process feature that allows gold to be substantially more easily used in combination with these extremely effective activating agents. As an additional advantage, this method allows gold to be deposited onto the support with the activating agent already in place. We think this is one reason why gold deposited in accordance with our invention is so active as deposited without requiring a subsequent thermal treatment.

Thermal treatment (calcining) of the activated support prior to gold deposition, however, can be very beneficial. In some instances, an activating agent may not function to the desired degree until after calcining For example, calcining tends to yield demonstrable improvements when the activating agent includes a nitrate salt. In other instances, the performance of an effective activating agent would be further enhanced. For example, the performance of generally effective carbonate salts can be enhanced to a degree via calcining Yet, salts such as potassium carbonate tend to already be in active form when impregnated, and the resultant activated supports are beneficially dried, e.g., at a temperature up to about 200° C. without really needing a calcining treatment.

In general, thermal treatment involves heating the impregnated support at a temperature in the range of 125° C. to about 1000° C. for a time period in the range of 1 second to 40 hours, preferably 1 minute to 6 hours, in any suitable atmosphere, such as air; an inert atmosphere such as nitrogen; carbon dioxide; argon; or a reducing atmosphere such as hydrogen; and the like. The particular thermal conditions to be used will depend upon factors including the nature of the support and the nature of the impregnants(s). Generally, thermal treatment should occur below a temperature at which the constituents of the impregnated support would be decomposed, degraded, or otherwise unduly thermally damaged. Many calcining treatments of impregnated supports are described in the examples below.

Although an activating agent may be supplied as a salt or the like, the resultant form of the salt or its constituent ions after incorporation into the heterogeneous catalyst system is not known with certainty. Analysis by x-ray diffraction shows no distinct oxide or carbonate phase of metal, although some carbonate per se is shown. It is believed, therefore, that the metal ions have reacted with and modified the support surface.

There is a wide range of applications for catalysts of the present invention. We believe that these catalysts will find application in the areas of treatment of automobile exhaust, as hydrogenation catalysts, as catalysts for the oxidation of hydrocarbons, and as catalysts for the removal of the oxides of nitrogen, and in sensors for detection and measurement of gases and vapors, and CO removal from inhabited areas. Respiratory protection devices such as smoke masks or escape hoods could usefully employ catalysts of the invention for the removal of hazardous CO or other gases from breathing air.

The catalysts of the present invention have been shown to be suitable for use in the demanding application of removal of CO from gas streams in automotive cabin air purification. In this application, large volumes of gas and high flow rates can be encountered. Thus, the residence time of the cabin air on the catalyst is short, being less than 0.05 seconds and even less than 0.03 seconds. Typically, the CO levels encountered are low, usually less than 200 ppm. The catalysts of the present invention have been shown to perform very well in these conditions and can be used in a variety of configurations in cabin air purification for a wide range of vehicles and vessels that carry passengers.

The present invention will now be further described in the following illustrative examples.

Figure 4A:
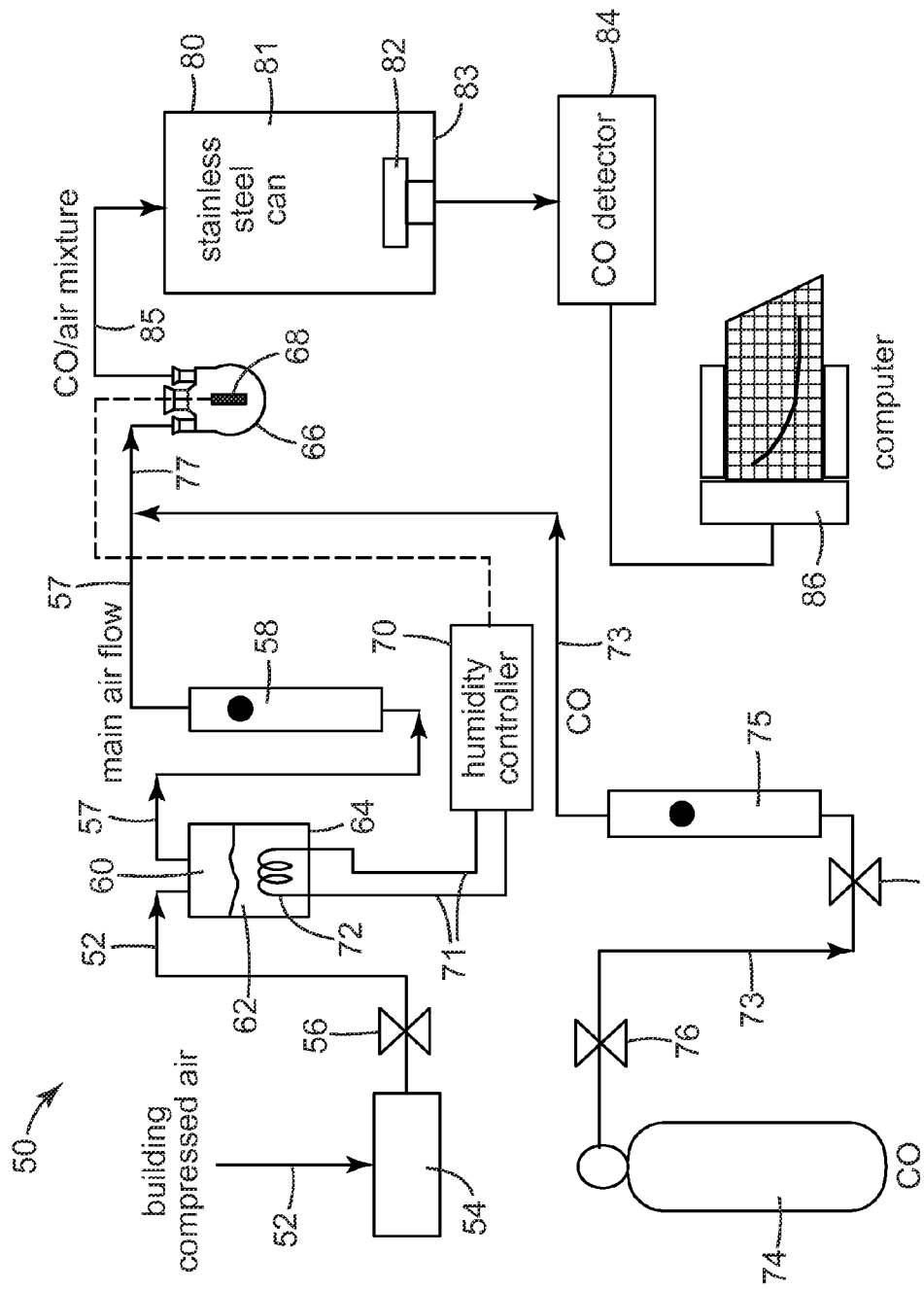
FIG. 4a schematically shows a testing system that was used to subject samples to CO challenges in order to assess catalytic characteristics for oxidizing CO.

Test Procedure 1: CO Challenge Testing of 50 to 200 mL of Granular Catalysts in a Fixture FIG. 4a shows testing system 50 used to subject catalyst samples to CO challenges in order to assess their performance as CO oxidation catalysts. High-pressure compressed air from supply line 52 is reduced in pressure, regulated, and filtered by regulator 54 (3M Model W-2806 Air Filtration and Regulation Panel, 3M, St. Paul, Minn.) to remove particulates and oils. Valve 56 (Hoke Inc., Spartanburg, S.C.) is used to set the desired main airflow rate as measured by a flow meter 58 (Gilmont®, Barnant Co, Barrington, Ill.) with a range of 0 to 90 LPM. The flow meter 58 was calibrated using a dry gas test meter (American Meter, model DTM-325; not shown). The main airflow passes through the headspace 60 above a heated distilled water bath 62 of vessel 64 and then passes via lines 57 and 77 into a 500 ml mixing flask 66. Relative humidity in the mixing flask is monitored using a RH sensor 68 (Type 850-252, General Eastern, Wilmington, Mass.). The RH sensor 68 provides an electrical signal to a humidity controller 70 (an Omega Engineering PID controller series CN1200 from Omega Engineering Inc., Stamford, Conn.) that delivers power via lines 71 to a submerged heater 72 to maintain the RH at the set point. Unless otherwise indicated, the relative humidity is controlled at >90%.

A cylinder 74 of carbon monoxide (Praxair, Inc., Danbury, Conn. 98.5%) equipped with a regulator 76 suitable for CO service provides a regulated flow of CO gas via line 73. A Gilibrator® bubble flow meter 75 (Sensidyne, Inc., Clearwater, Fla.) measures volumetric CO flow rate in the range 20 mL/min to 6 L/min. A stainless steel, fine metering valve 78 (Swagelok Co, part SS-SS2, Solon, Ohio) is used to set the desired CO flow rate. The metered CO is combined with the humidified air in the mixing flask 66.

This system can deliver mixtures of CO and air at concentrations from about 1000 ppm CO to about 20,000 ppm CO at flow rates from about 15 L/min to about 80 L/min at RH values from about 5% to approximately 95%. More dilute mixtures for detector calibration were generated by replacing the cylinder of carbon monoxide 74 with a cylinder of a certified mixture of CO in air or nitrogen (typically from 500 to 5000 ppm CO; Quality Standards, Pasadena, Tex.).

The combined stream then flows via line 85 into an inverted, 12-quart, stainless steel beaker 80 with a 29/42 outer joint welded into the top closably engaging a support platform 83 defining test chamber 81. Inside the beaker 80 is a test fixture 82. The beaker 80 is sealed to support platform 83 using a foam gasket (not shown). Two clamps (not shown) ensure a tight seal to the support platform 83. The beaker 80 can be removed to allow catalyst test fixtures to be placed inside for testing and taken out after testing is complete. The support platform 83 is equipped with an inner 29/42 tapered fitting (not shown) onto which the fixture 82 containing the catalyst to be tested is mounted. A drawing of the fixture 82 is shown in FIG. 2 of ASTM Standard Guide for Gas-Phase Adsorption Testing of Activated Carbon D5160-95.

The CO concentration from the test stream emerging from the outlet of the test chamber is measured by CO detector system 84. The results are processed via computer 86. Two embodiments of CO detector system 84 are preferred. In one embodiment, CO detector system 84 includes an SRI 8610C gas chromatograph (SRI Instruments, Torrance, Calif.) equipped with a gas sampling valve and a detector that responds to CO. A diaphragm pump (KNF Neuberger, Inc., Trenton N.J. UNMP830 KNI) continuously draws approximately 50 mL/min of sample from the test outlet through the gas sampling valve of the GC. Periodically the valve injects a sample onto a 3 ft 13× molecular sieve column. CO is separated from air and its concentration measured by either a helium ionization detector (minimum detectable CO concentration about 10 ppm) or a methanizer/FID detector (minimum detectable CO concentration less than 1 ppm). The GC is calibrated using CO in air mixtures generated using the test system described above. Results of this calibration agree to within 3% of those from certified standard CO in air or nitrogen mixtures in the range from 500 to 5000 ppm CO (Quality Standards, Pasadena, Tex.). Each CO analysis takes about 3 minutes. After completion of the analysis, another sample is injected onto the column and the analysis repeated.

In another embodiment, CO detection system 84 uses a Brüel & Kjær Multigas Monitor Type 1302 (Brüel & Kjæer, Nærum, Denmark; not shown) equipped with optical filter #984 to detect CO. The Multigas Monitor is calibrated using the test system described above. The temperature of the air stream is monitored downstream of the test fixture using a K-type thermocouple (not shown) and digital readout (not shown) (Fluke 51 K/J Thermometer, Fluke Corporation, Everett, Wash.).

Catalyst samples are sieved to remove fines prior to testing. Unless otherwise specified, samples were sieved to remove particles finer than 25 mesh using ASTM E 11 U.S. Standard Sieves. A specified catalyst volume, typically 100 ml, is loaded into the 3.5 inch inner diameter aluminum test fixture 82. The fixture is loaded with catalyst using a snowstorm filling technique in which the catalyst falls into the test fixture 82 through a loading column containing screens to evenly distribute the catalyst across the bed. Typical bed depth is approximately 1.6 cm (0.6 in). To begin the test, test fixture 82 containing the catalyst is placed on the 29/42 fitting on the support platform 83. The beaker 80 is replaced and sealed to the support platform 83. Outlet CO concentration measurements begin when the CO/air mixture is introduced into the test chamber 81. Measurements continue for a specified time period, typically 30 minutes.

Test Procedure 2: CO Challenge Testing of 2.5 to 10 ml of Granular Catalysts (Tube Test)

Figure 4B:
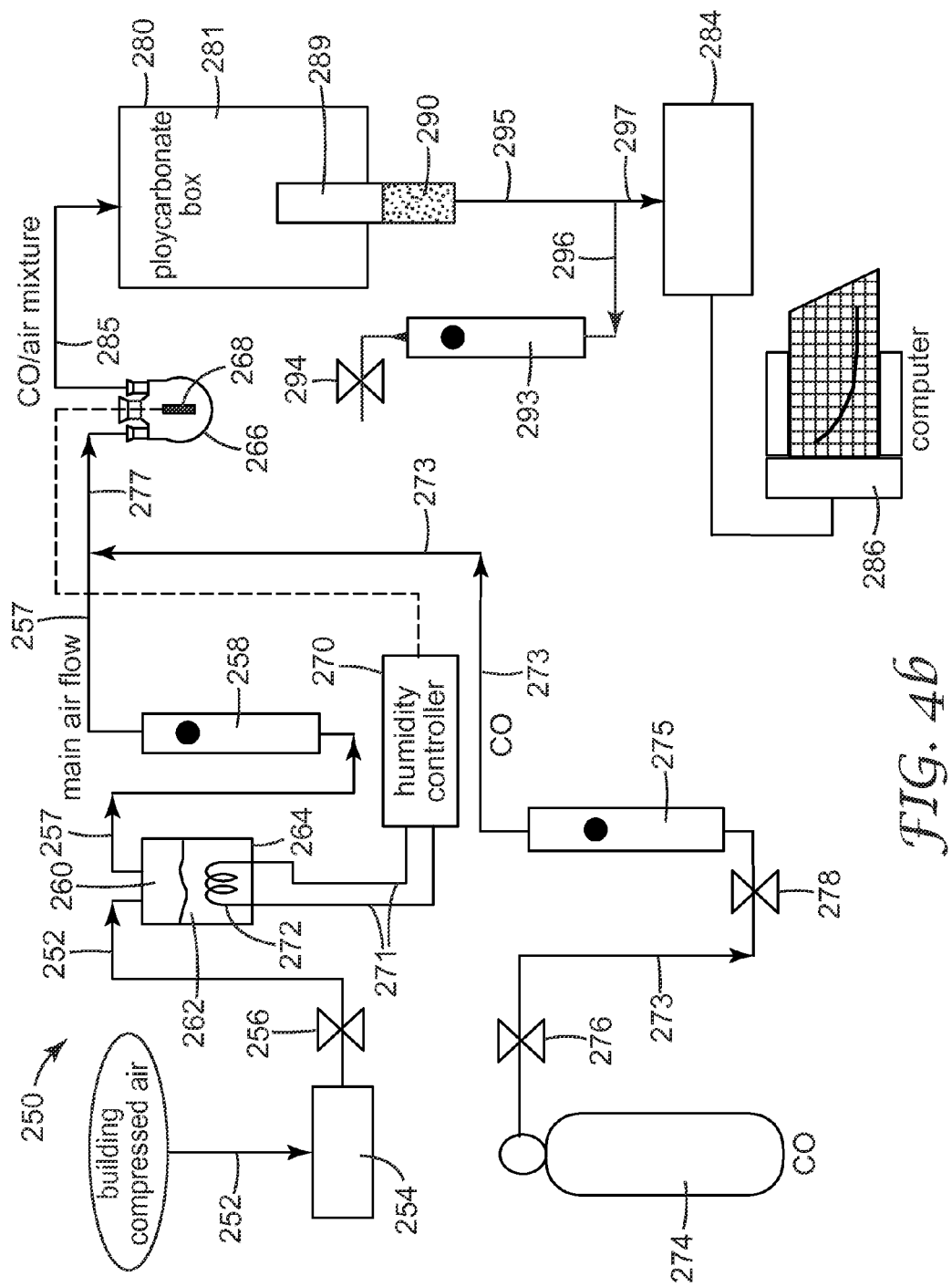
FIG. 4b schematically shows a testing system that was used to subject samples to CO challenges in order to assess catalytic characteristics for oxidizing CO.

FIG. 4b shows a test system 250 used to quickly screen small quantities of new catalyst formulations for activity. While system 50 (See FIG. 4a) used in test procedure 1 requires from about 50 to 200 mL of sample, the system 250 of this procedure allows testing to be done with sample volumes ranging from about 2.5 to about 10 mL. The system 250 used to test CO/air mixtures in this procedure is similar to system 50, but with a few differences. Features of system 250 that are identical to similar features of FIG. 4b are identified by the same reference numerals incremented by 200. A polycarbonate box 287 with 29/42 connections (not shown) at the top and bottom replaces the stainless steel beaker 80 and support platform 83 of system 50. A CO/air mixture of the desired concentration flows into this box 287 via line 285 typically at 64 L/min and >90% RH. A portion of this flow (from about 1 L/min to about 10 L/min) is pulled through a tube 289 containing the catalyst sample 290 while the excess is vented outside the box 287 via vent 291.

The catalyst sample 290 of known volume is loaded into tube 289 (a ⅝ inch ID (¾ inch OD) copper tube about 3.5 inches in length sealed at one end by a cotton plug (not shown)). The volume of the sample is determined by loading it into a graduated cylinder using the method described in ASTM D2854-96 Standard Method for Apparent Density of Activated Carbon. This measured volume is then loaded into the copper tube using the same method.

The tube 289 containing the catalyst sample 290 is introduced up through the 29/42 inner fitting at the bottom of the polycarbonate box 287 so that the open end extends into the box. The other end of the tube is equipped with a ¾ inch Swagelok® nut and ferrule (not shown) for easy connection and disconnection to/from the test system 250. The nut engages a female fitting (not shown) in a ½ inch OD tube 295 connected via a branch 296 to a vacuum source (not shown) through a rotameter 293 and needle valve 294. The tube 295 also connects to the inlet of the diaphragm pump (not shown) via branch 297 which draws sample to the sampling valve of a gas chromatography instrument and CO detector used as CO detection system 284 (just as in test procedure 1). The small flow to the gas chromatography instrument (approximately 50 mL/min) is usually negligible in comparison to the total flow through the catalyst bed. The rotameter 293 is calibrated by placing a Gilibrator soap bubble flow meter (not shown) at the entrance to the copper tube containing the catalyst.

To start the test, a steady 64 L/min flow of a CO/air mixture of the desired concentration and RH is introduced into the polycarbonate box 287. The needle valve 294 is then adjusted to give the desired flow through the catalyst sample 290. The CO concentration in the air exiting the catalyst sample 290 is analyzed by the CO detection system 284 as in test procedure 1.

Test Procedure 3: CO Challenge Testing of Powder Samples (Less than 1 ml)

Figure 5:
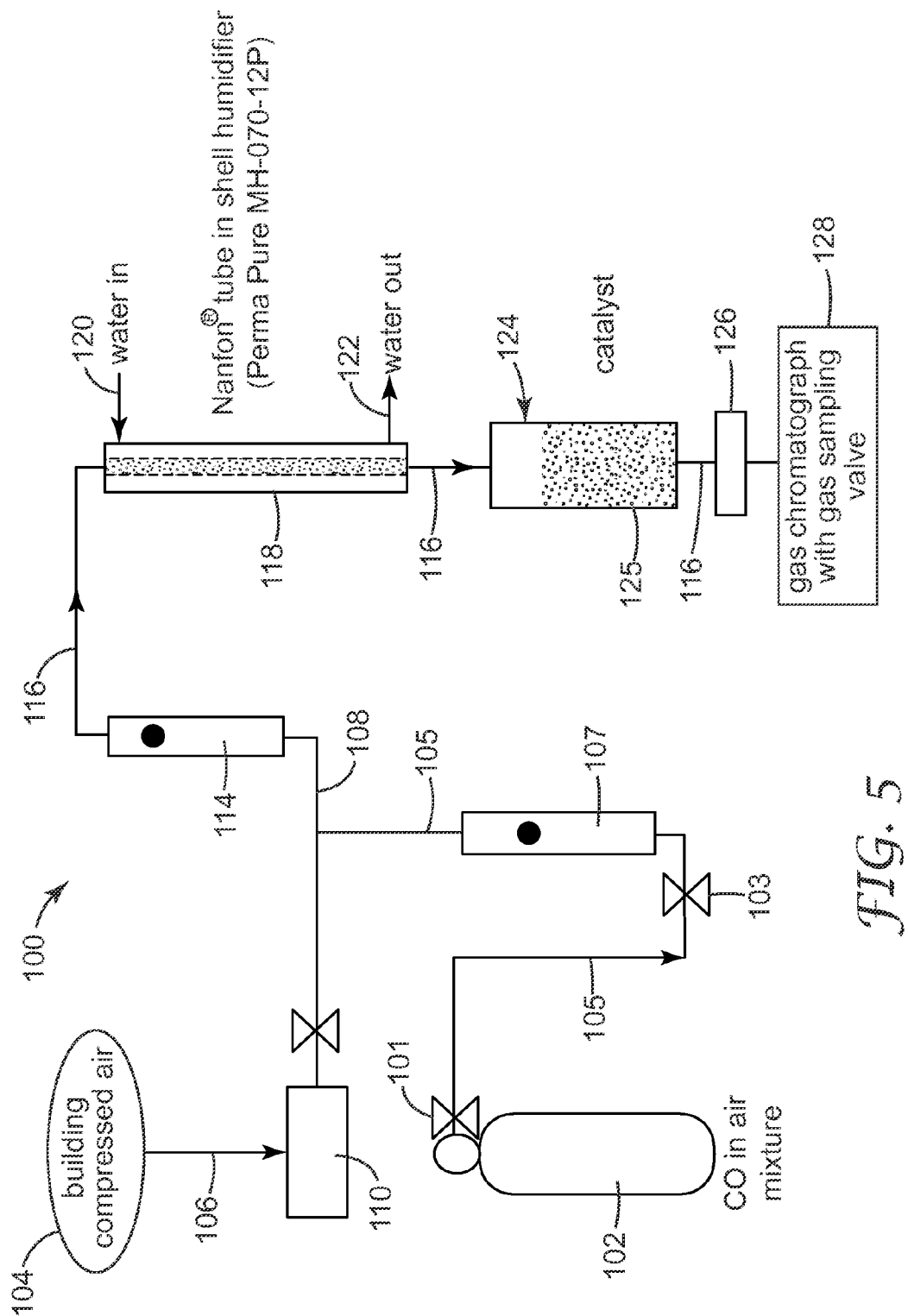
FIG. 5 schematically shows a system used for chromatographic analysis of catalytic characteristics of samples.

FIG. 5 shows a system 100 used for analysis of the catalytic characteristics of catalysts in the form of fine powders. System 100 includes a high pressure CO in air mixture (1.9% v/v) stored in tank 102 and is also coupled to a source 104 of building compressed air via line 106. Pressure regulator and shut off valve 101 and fine needle valve 103 help control the flow of CO in air through line 105. The flow of CO in air is measured by rotameter 107 (Alphagaz (Air Liquide) 3502 flow tube, Morrisville, Pa.).

The flow of building compressed air through line 106 is reduced in pressure, regulated, and filtered by regulator 110 (3M Model W-2806 Air Filtration and Regulation Panel, 3M Company, St. Paul, Minn.). Fine needle valve 112 is used to set the desired airflow rate through line 106.

The flows of CO in air and the building compressed air are combined at juncture 108 to provide a CO in air mixture of the desired concentration and flow rate. Rotameter 114 (Aalborg Instruments 112-02 flowtube, Orangeburg, N.Y.) on line 116 measures the total flow of the combined streams. The rotameters are calibrated using a Gilibrator® bubble flow meter (not shown) placed at the catalyst bed. The two rotameters 107 and 114 are chosen to obtain concentrations from about 1000 to 20,000 ppm CO at flow rates from about 100 mL/min to about 500 mL/min under lab ambient conditions.

The diluted CO in air mixture in line 116 is then humidified to the desired RH by passing the air mixture through the inner tube of a tube in shell Nafion® humidifier 118 as shown (Perma Pure MH 070-12P; Toms River, N.J.). Water is introduced to the humidifier 118 through line 120 and exits via line 122. This humidifier humidifies a CO/air stream to >90% RH at flow rates up to at least 400 mL/min. This was verified with a General Eastern Hygro-M1 optical mirror dew point hygrometer (GE General Eastern Instruments, Wilmington Mass.).

The catalyst sample (usually about 1-2 cm in depth) is snowflaked into a section of thick walled 4 mm ID polyethylene tubing 124 about 8 cm in length to form a catalyst bed 125. A cotton plug (not shown) seals one end of tubing 124. The CO in air mixture passes through the catalyst bed and then through a particulate cartridge filter 126 (Balston DFU sample filter grade BQ, Parker Hannifin Corporation, Tewksbury, Mass.) into a SRI 8610C gas chromatograph (SRI Instruments, Torrance, Calif.) equipped with a gas sampling valve and a detector that responds to CO. The particulate filter 126 protects the gas sampling valve from damage by particulates escaping the catalyst bed.

The gas sampling valve periodically injects the exit stream from the catalyst bed onto a 3 ft molecular sieve 13× column. This separates CO from air. CO concentration is determined by either a helium ionization detector (CO detection limit≈10 ppm) or a methanizer/hydrogen flame ionization detector (CO detection limit less than 1 ppm). The CO concentration is measured approximately every four minutes during the test, displayed, and recorded in a data file. Calibration is by the method described in test procedure 1.

Gold Application Method: Process for Deposition of Gold Nanoparticles onto Substrate particles:

The apparatus described in the detailed description and shown in FIGS. 2 and 3 is used as follows to prepare catalytic materials according to the following procedure, unless expressly noted otherwise. 300 cc of substrate particles are first heated to about 200° C. in air overnight (120° C. in the case of carbon substrates) to remove residual water. They are then placed into the particle agitator apparatus 10 while hot, and the chamber 14 is then evacuated. Once the chamber pressure is in the $10^{-5}$ ton range, the argon sputtering gas is admitted to the chamber 14 at a pressure of about 10 millitorr. The gold deposition process is then started by applying a pre-set power to the cathode. The particle agitator shaft 40 is rotated at about 4 rpm during the gold deposition process. The power is stopped after the pre-set time. The chamber 14 is backfilled with air and the gold coated particles are removed from the apparatus 10. The gold sputter target 32 is weighed before and after coating to determine the amount of gold deposited. In general, about 20% of the weight loss of the target represents gold deposited on the sample.

During the deposition process the gap between the blades 42 and the chamber wall was set to a pre-set value, e.g., 1.7 mm to 2.7 mm or even more if comminution is desirably avoided.

Example 1

Sputtered Au on $TiO_2$/Kuraray GG Carbon: Effect of Step Change in CO Inlet Concentration This sample was prepared by sputter coating gold onto 300 mL of Kuraray GG 12×20 mesh, activated carbon that had been coated with 10% Ishihara ST-31 titania dispersed in DI water.

22.1 grams of ST-31 titania (Ishihara Sangyo Kaisha, LTD, Tokyo, Japan) was dispersed into 160 grams of deionized water utilizing an IKA Ultra Turrax T18 homogenizer (IKA Works, Inc., Wilmington, Del.). The slurry was spritzed (pumping the titania dispersion with a peristaltic pump (Cole Palmer Instruments Co, Chicago, Ill., model wz1r057) at 150 gr/min through a Qorpak finger-actuated trigger-sprayer (Qorpak, Bridgeville, Pa.) as a fine mist) onto 200 grams of Kuraray GG 12×20 mesh activated carbon that was mixed in a 1 gallon steel reactor rotating at 18 rpm at 20 degree angle. After the granules were coated, a heat gun was used to remove enough water to allow the granules to flow freely in the rotating reactor. The coated granules were dried at 120 C. in an oven for approximately 2 hours giving a uniform white coating. The sample was further dried at 150° C. for 24 hours. 129.54 grams of the sample was coated with 0.88 grams gold (weight loss from the target) deposited via PVD. The coater used an agitator with a height of 2.7 cm, blade gap of 1.7 mm, and the holed blade was rotated at 4 rpm. The background pressure was $8.7 \times 10^{-5}$ ton. The sputter power was 0.03 kw for 1 hour.

Figure 10:
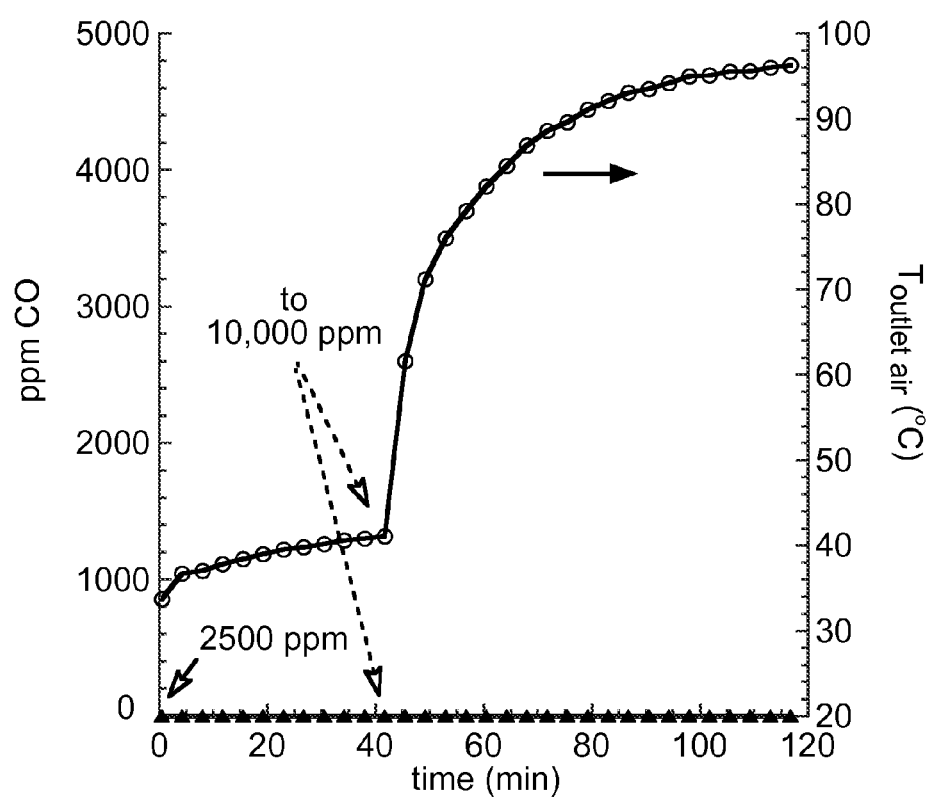
FIG. 10 is a graph demonstrating the effect of step change in CO inlet concentration under conditions itemized in Example 1.

100 mL of the sample (43.1 g) was tested (test procedure 1) against a CO challenge at 30 L/min in a 3.5 inch diameter aluminum test fixture. Test relative humidity (RH) was 93%. A thermocouple at the filter exit measured air temperature. The GC used in this test is equipped with a methanizer/FID detector that is capable of detecting CO at levels below 1 ppm. The initial CO challenge concentration at the beginning of the test was 2500 ppm. No CO was detected at the filter outlet during the course of this challenge. The temperature of the air at the filter outlet (open circles on the graph) increased steadily and reached about 41° C. after about 40 minutes. At about 42 minutes into the test, the inlet CO concentration was increased suddenly to 10,000 ppm. Still, no CO was observed at the filter outlet. Air temperature at the outlet began to rise sharply and reached about 96° C. at the end of the test. The fast response to a sudden change in inlet CO concentration observed with this catalyst in this test is highly desirable in a respirator filter against CO. The test results are shown in FIG. 10.

The data depicted by the open circles shows the temperature at the outlet during the course of the test. The data depicted by the black triangles shows the measured CO content at the outlet. The response of the filtering system to the stepwise increase in CO in the challenge stream was so rapid that no discernible spike in CO at the outlet was detected.

Example 2

Figure 11:
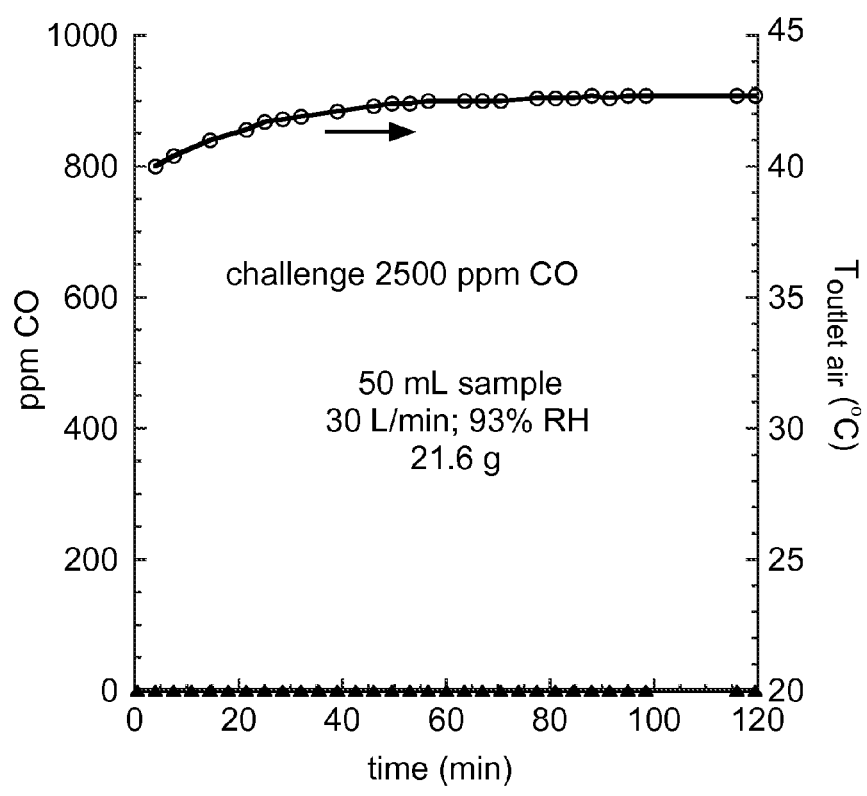
FIG. 11 is a graph demonstrating the results of Example 2.

Sputtered Au on $TiO_2$/Kuraray GG Carbon: Lesser Amount of Catalyst Material The test of Example 1 was repeated, except only 50 mL of the same catalyst was used. Further, the CO challenge was held at 2500 ppm (no stepwise increase to 10,000 ppm was used in this test). The test results are shown in FIG. 11. The data depicted by the open circles show the temperature data at the outlet, and the data depicted by the black triangles show the detected CO data at the outlet. No CO was detected at the filter outlet during the entire 120 minutes of testing. The temperature of the air at the filter outlet (open circles on the graph) increased slightly and then remained steady at about 42.7° C. This example illustrates the extremely high activity for CO oxidation of the catalysts of the present invention.

Example 3

Sputtered Au on $TiO_2$/Kuraray GG Carbon: Effect of Step Change in CO Inlet Concentration at Higher Flow Rate This sample was prepared by sputter coating gold onto 300 mL of Kuraray GG 12×20 activated carbon that had been coated with 10% Hombikat UV100 titania dispersed in DI water. 22.1 grams of Hombikat UV 100 (Sachtleben Chemie Gmbh, Duisburg, Germany) was dispersed into 150 grams of deionized water utilizing an IKA Ultra Turrax T18 homogenizer (IKA Works, Inc., Wilmington, Del.). The slurry was spritzed (pumping the titania dispersion with a peristaltic pump (Cole Palmer Instruments Co, Chicago, Ill., model wz1r057) at 150 gr/min through a Qorpak finger-actuated trigger-sprayer (Qorpak, Bridgeville, Pa.) as a fine mist) onto 200 grams of Kuraray GG 12×20 mesh activated carbon that was mixed in a rotating 1 gallon steel reactor rotating at 18 rpm at 20 degree angle. After the granules were coated, a heat gun was used to remove enough water to allow the granules to flow freely in the rotating reactor. The coated granules were dried at 120° C. in an oven for approximately 2 hours giving a uniform white coating. The sample was further dried at 150° C. for 24 hours. 126 grams of the sample was coated with 1.34 grams gold (weight loss from the target). The coater used an agitator with a height of 2.7 cm, blade gap of 2.7 mm, and the holed blade was rotated at 4 rpm. The background pressure was $8.50 \times 10^{-5}$ torr. The sputter power was 0.04 kW for 1 hour.

50 mL of the sample was tested (test method 1) as in Example 1, but at 64 L/min flow instead of the 30 L/min. As further differences, the CO challenge concentration at the beginning of the test was 1200 ppm, and the inlet CO concentration was increased suddenly to 10,000 ppm at about 60 minutes. AP of the sample in the fixture was 18.5 mm $H_2O$ at 85 L/min. Test RH was >90%.

Figure 12:
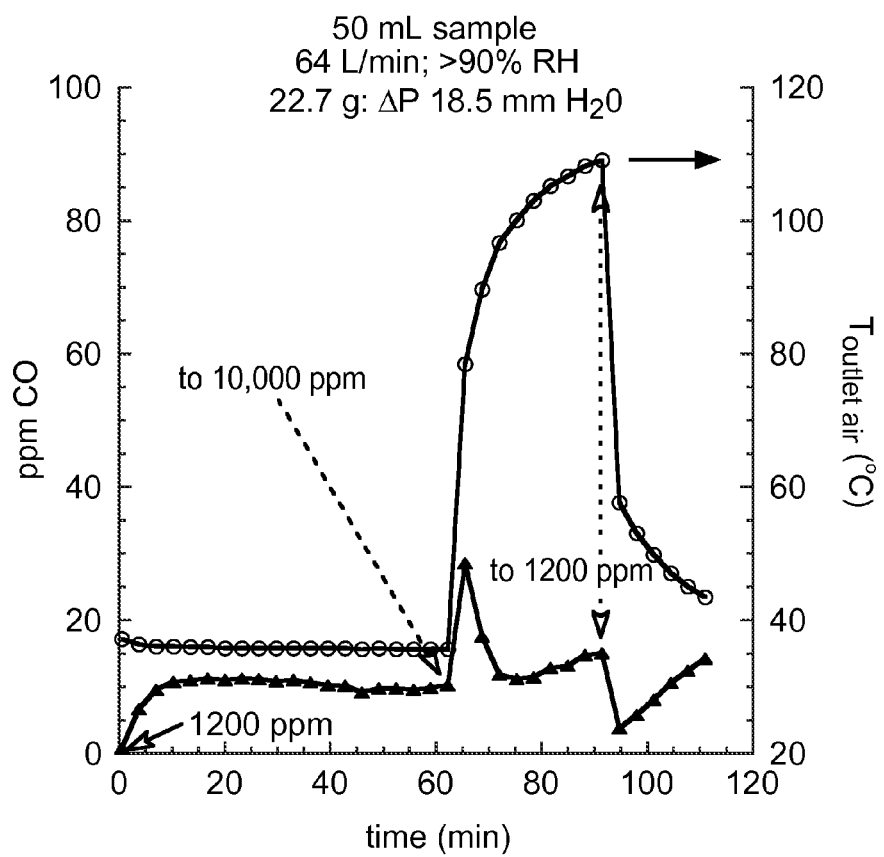
FIG. 12 is a graph demonstrating the results of Example 3.

The results are shown in the graph of FIG. 12. The data depicted by the open circles show the temperature data at the outlet, and the data depicted by the black triangles show the detected CO data at the outlet. CO concentration at the outlet of the filter quickly reached a plateau of about 10 to 11 ppm. Almost no temperature spike from the interaction of water vapor in the wet challenge gas with the dry catalyst was observed. The temperature of the air at the filter outlet (open circles) remained steady at about 36° C. After the CO challenge was stepwise increased to 10,000 ppm, the CO concentration at the outlet moderately spiked upward but quickly dropped back to 12-15 ppm. Air temperature at the outlet began to rise sharply and reached about 109° C. After about 90 minutes, the CO inlet concentration was reduced back to 1200 ppm. The catalyst continued to function even as the temperature dropped to less than 50° C. The catalyst in this example increased in weight by 0.8 g during the test.

The outlet CO concentration during this test also was monitored with a B&K gas analyzer. This device can analyze the CO content of a sample about every minute while the GC takes about 3 minutes to complete an analysis. The maximum CO concentration measured by the B&K was 111 ppm.

The fast response to a sudden change in inlet CO concentration observed with this catalyst in this test is highly desirable in a respirator filter against CO. The response of this sample to the stepwise increase was much faster and much more moderate than the response of the sample in Comparative Example A (below) in which an alumina host was used.

Example 4

12.5 wt Percent Hombikat on GG Carbon Coated in a Deionized Water Slurry 28.5 grams of Hombikat UV 100 (Sachtleben, Germany) was dispersed into 160 grams of deionized water utilizing an IKA Ultra Turrax T18 homogenizer (IKA Works, Inc., Wilmington, Del.). The slurry was spritzed (pumping the titania dispersion with a peristaltic pump (Cole Palmer Instruments Co, Chicago, Ill., model wz1r057) at 150 gr/min through a Qorpak finger-actuated trigger-sprayer (Qorpak, Bridgeville, Pa.) as a fine mist onto 200 grams of Kuraray GG 12×20 mesh activated carbon that was mixed in a 1 gallon steel reactor rotating at 18 rpm at 20 degree angle. After the granules were coated, a heat gun was used to remove enough water to allow the granules to flow freely in the rotating reactor. The coated granules were dried at 120° C. in an oven for approximately 2 hours giving a uniform white coating. The sample was further dried at 150° C. for 24 hours. 126 grams of the sample was coated with 6.98 grams gold (weight loss from the target) using PVD techniques. The coater used an agitator with a height of 2.7 cm and the holed blade was rotated at 4 rpm. The background pressure was $7.90 \times 10^{-5}$ torr. The sputter power was 0.12 kW for 2 hour.

Example 5

10 wt Percent ST-31 on GG Carbon Coated in a Deionized Water Slurry 22.1 grams of ST-31 (Ishihara, Japan) was dispersed into 160 grams of deionized water utilizing an IKA Ultra Turrax T18 homogenizer (IKA Works, Inc., Wilmington, Del.). The slurry was spritzed (pumping the titania dispersion with a peristaltic pump (Cole Palmer Instruments Co, Chicago, Ill., model wz1r057) at 150 gr/min through a Qorpak finger-actuated trigger-sprayer (Qorpak, Bridgeville, Pa.) as a fine mist onto 200 grams of Kuraray GG 12×20 mesh activated carbon that was mixed in a 1 gallon steel reactor rotating at 18 rpm at 20 degree angle. After the granules were coated, a heat gun was used to remove enough water to allow the granules to flow freely in the rotating reactor. The coated granules were dried at 120° C. in an oven for approximately 2 hours giving a uniform white coating. The sample was further dried at 150° C. for 24 hours. 133 grams of the sample was coated with 3.56 grams gold (weight loss from the target) using PVD techniques. The coater used an agitator with a height of 2.7 cm and the holed blade was rotated at 4 rpm. The background pressure was $1.020 \times 10^{-5}$ torr. The sputter power was 0.12 kW for 1 hour.

Example 6

12.5 wt Percent ST-31 on GG Carbon Coated in a 0.5M KOH Slurry 28.5 grams of ST-31 (Ishihara, Japan) was dispersed into 160 grams of 0.5 M KOH utilizing an IKA Ultra Turrax T18 homogenizer (IKA Works, Inc., Wilmington, Del.). The slurry was spritzed (pumping the titania dispersion with a peristaltic pump (Cole Palmer Instruments Co, Chicago, Ill., model wz1r057) at 150 gr/min through a Qorpak finger-actuated trigger-sprayer (Qorpak, Bridgeville, Pa.) as a fine mist onto 200 grams of Kuraray GG 12×20 mesh activated carbon that was mixed in a 1 gallon steel reactor rotating at 18 rpm at 20 degree angle. After the granules were coated, a heat gun was used to remove enough water to allow the granules to flow freely in the rotating reactor. The coated granules were dried at 120° C. in an oven for approximately 2 hours giving a uniform white coating. The sample was further dried at 150° C. for 24 hours. 143 grams of the sample was coated with 6.56 grams gold (weight loss from the target) using PVD techniques. The coater used an agitator with a height of 2.7 cm and the holed blade was rotated at 4 rpm. The background pressure was $9.0 \times 10^{-5}$ torr. The sputter power was 0.24 kW for 1 hour.

Example 7

10 wt Percent ST-31 on GG Carbon Coated in a 0.5M KOH Slurry 22.1 grams of ST-31 (Ishihara, Japan) was dispersed into 160 grams of 0.5 M KOH utilizing an IKA Ultra Turrax T18 homogenize (IKA Works, Inc., Wilmington, Del.). The slurry was spritzed (pumping the titania dispersion with a peristaltic pump (Cole Palmer Instruments Co, Chicago, Ill., model wz1r057) at 150 gr/min through a Qorpak finger-actuated trigger-sprayer (Qorpak, Bridgeville, Pa.) as a fine mist onto 200 grams of Kuraray GG 12×20 mesh activated carbon that was mixed in a rotating 1 gallon steel reactor rotating at 18 rpm at 20 degree angle. After the granules were coated, a heat gun was used to remove enough water to allow the granules to flow freely in the rotating reactor. The coated granules were dried at 120° C. in an oven for approximately 2 hours giving a uniform white coating. The sample was further dried at 150° C. for 24 hours. 137 grams of the sample was coated with 6.34 grams gold (weight loss from the target) using PVD techniques. The coater used an agitator with a height of 2.7 cm and the holed blade was rotated at 4 rpm. The background pressure was $1.06 \times 10^{-5}$ torr. The sputter power was 0.24 kw for 1 hour.

Example 8

CO Catalytic Performance for Samples 4-7

Figure 9:
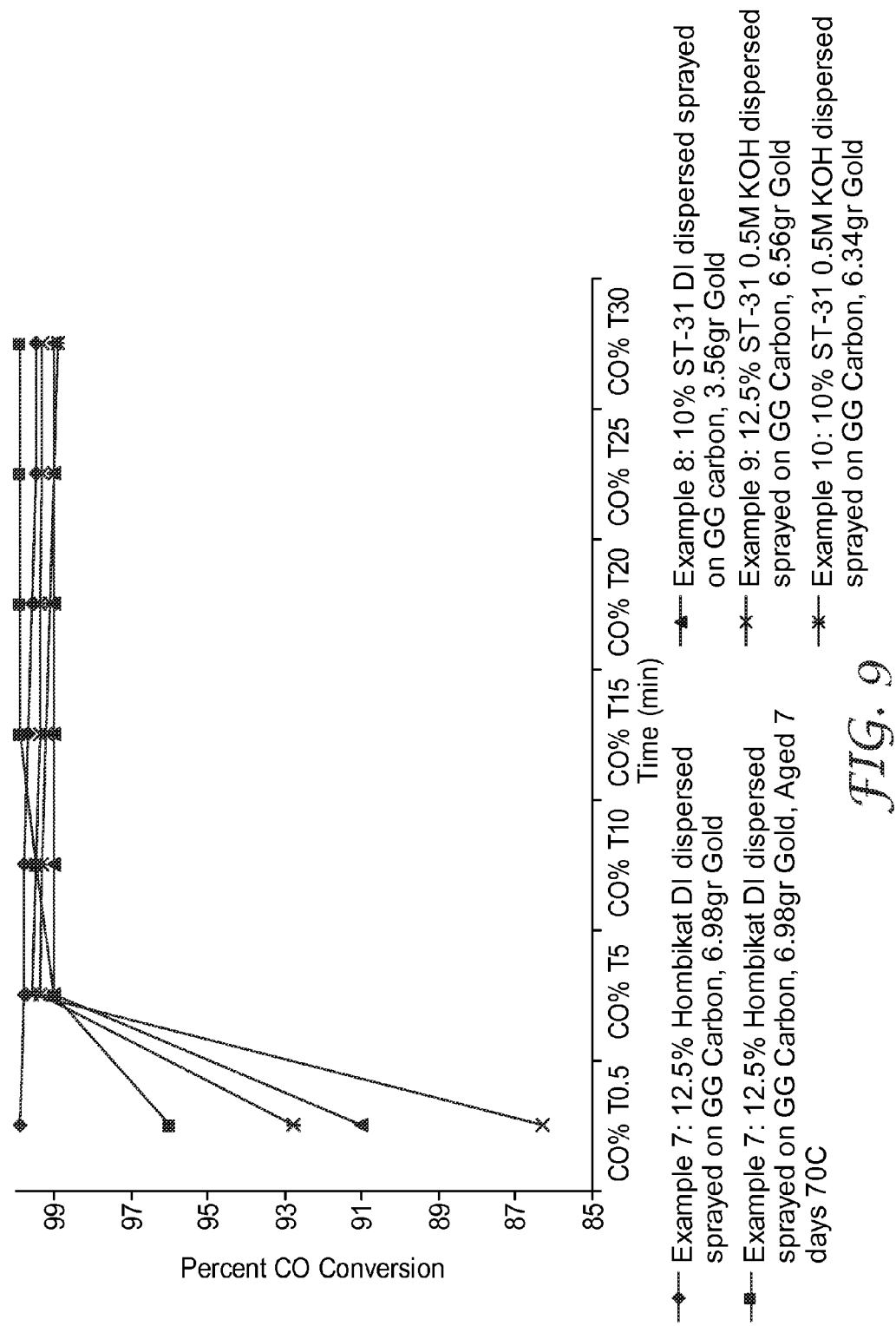
FIG. 9 is a graph demonstrating the effectiveness by which the catalysts of Examples 4 through 7 catalyze CO.

The following table shows the performance of Samples 4 through 7 with respect to CO oxidation. The performance of these samples is also depicted in FIG. 9.

| Sample Number | Sample Description | CO % T0.5 | CO % T5 | CO % T10 | CO % T15 | CO % T20 | CO % T25 | CO % T30 |
|---|---|---|---|---|---|---|---|---|
| 4 | 12.5% Hombikat DI dispersed sprayed on GG Carbon, 6.98 g Gold | 99.9 | 99.8 | 99.8 | 99.7 | 99.6 | 99.5 | 99.5 |

-continued

| Sample Number | Sample Description | CO % T0.5 | CO % T5 | CO % T10 | CO % T15 | CO % T20 | CO % T25 | CO % T30 |
|---|---|---|---|---|---|---|---|---|
| 4 | 12.5% Hombikat DI dispersed sprayed on GG Carbon, 6.98 g Gold, Aged 7 days 70 C. | 96 | 99 | 99.5 | 99.9 | 99.9 | 99.9 | 99.9 |
| 5 | 10% ST-31 DI dispersed sprayed on GG carbon, 3.56 g Gold | 91 | 99 | 99 | 99 | 99 | 99 | 99 |
| 6 | 12.5% ST-31 0.5M KOH dispersed sprayed on GG Carbon, 6.56 g Gold | 86.3 | 99.6 | 99.5 | 99.4 | 99.4 | 99.3 | 99.3 |
| 7 | 10% ST-31 0.5M KOH dispersed sprayed on GG Carbon, 6.34 g Gold | 92.8 | 99.4 | 99.3 | 99.2 | 99.1 | 99 | 98.9 |

Comparative Example A

Sputtered Au on $TiO_2$/Washed Alcoa 450 Alumina: Effect of Step Change in CO Inlet Concentration This sample was prepared by sputter coating gold onto 300 mL of washed Alcoa 450 alumina beads that had been coated with 10% Hombikat UV100 titania dispersed in 0.5 M $K_2CO_3$ solution.

The titania coated Alcoa 450 alumina beads were prepared in the following manner. A colorant dispersion comprising $\gamma$-$Fe_2O_3$ in water was prepared by washing 30.07 g of $\gamma$-$Fe_2O_3$ (Sigma Aldrich Fine Chemicals, Milwaukee, Wis.) with 500 ml of deionized water by centrifugation. This material was then washed with 500 ml of a potassium carbonate solution prepared by dissolving 3.0 g of potassium carbonate in 500 ml of deionized water. The material was final washed with 500 ml of deionized water and was separated by centrifugation. The recovered solid was redispersed in deionized water to a concentration of 1.64% iron oxide by weight. This dispersion was used to provide color to the titania dispersion so as to be able to monitor the uniformity of the titania coated onto the Alcoa 450 alumina beads.

To prepare the Alcoa 450 alumina beads for use, about 1 liter of beads were immersed in 2 liters of deionized water. These were poured into a large buchner funnel attached to a filter flask. The wash water was allowed to drain from the funnel into the flask by means of gravity. The beads were further washed by the slow addition of 8 liters of deionized water. The beads were further separated from the wash water by applying aspirator vacuum to the funnel. The beads were dried at 140° C. in an oven and were placed in a sealed jar to cool prior to use.

A titania dispersion was prepared by mixing with a high shear mixer (IKA Ultra Turrax T18 mixer; IKA Works, Inc., Wilmington, Del.) 10.0 g of Hombikat UV100 titania (Sachtleben Chemie Gmbh, Duisburg, Germany) with 10.1 g of the $\gamma$-$Fe_2O_3$ colorant dispersion, 5.0 g potassium carbonate and 90.2 g of deionized water. This mixture was applied to 215.0 g of the washed Alcoa 450 alumina beads by spraying the dispersion through a Qorpak finger-actuated trigger-sprayer (Qorpak, Bridgeville, Pa.) as a fine mist onto a shallow bed of the Alcoa 450 alumina beads uniformly spread out on a glass tray. The bed of alumina beads was mixed gently using a rubber policeman after every 2 sprays to provide a uniform coating of the beads with the titania dispersion. After application, the coated beads were dried at 100° C. in an oven for one hour and then at 140° C. for 2 hours.

A catalyst sample of this material was prepared by sputter coating a 300 ml sample of the titania-coated Alcoa 450 alumina beads with gold according to deposition conditions: cathodic power 0.03 kW; sputter time—60 minutes; blade gap 6.9 mm; gold target weight loss 1.14 g.

Figure 13:
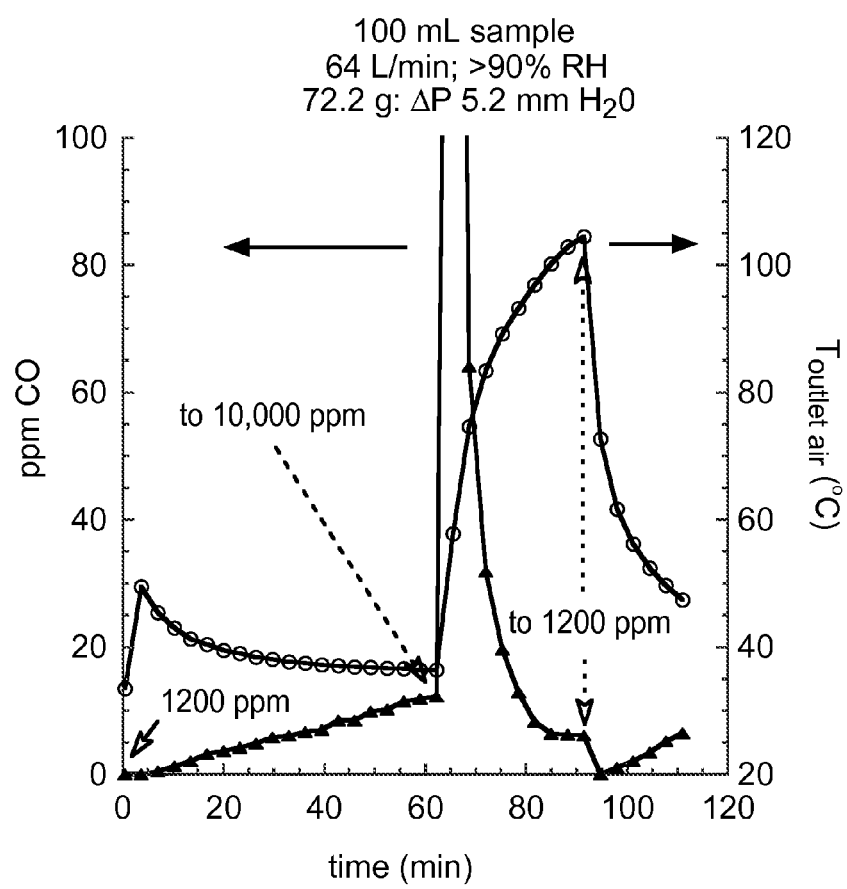
FIG. 13 is a graph demonstrating the results of Comparative Example A.

100 mL of the sample was tested (test procedure 1) under the same conditions as example 3. ΔP of the sample in the fixture was 5.2 mm $H_2O$ at 85 L/min. Test RH was >90%. The test results are shown in FIG. 13. The data depicted by the open diamonds show the temperature data at the outlet, and the data depicted by the black triangles show the detected CO data at the outlet. CO concentration at the outlet of the filter (solid triangles) increased slowly from 0 to about 12 ppm over an hour. The temperature of the air at the filter outlet (open circles) spiked to about 54° C. when the wet challenge air contacted the dry catalyst. This spike in temperature did not occur with the activated catalyst sample of example 3 in which the host was carbon. Temperature then slowly dropped to about 36.5° C. over an hour.

At about 60 minutes into the test the inlet CO concentration was increased suddenly to 10,000 ppm. CO concentration at the outlet spiked upward significantly before dropping back to about 6 ppm. The recovery time for this sample was slower than that for Example 3.

The outlet CO concentration during this test was also monitored with a B&K gas analyzer. This device can analyze the CO content of a sample about every minute while the GC takes about 3 minutes to complete an analysis. The maximum CO concentration measured by the B&K was 1170 ppm, which is an order of magnitude greater than the more moderate spike observed in Example 3. Air temperature at the outlet began to rise sharply and reached about 105° C.

After about 90 minutes, the CO inlet concentration was dropped back to 1200 ppm. The catalyst continued to function even as the temperature dropped to less than 50° C. The catalyst increased in weight by 7.7 g during the test. The alumina catalyst in this example allowed more CO to slip through the bed before low CO outlet concentrations were re-established than did the activated carbon catalyst in example 3.

Example 9

Sputtered Au on $TiO_2$/Kuraray GG Carbon: Effect on Physical Adsorption of Cyclohexane The catalyst was tested against a cyclohexane challenge to evaluate its capability for physical adsorption of organic vapors. Untreated Kuraray GG 12×20 activated carbon was tested as a control. A titania dispersion was prepared by mixing with a high shear mixer (IKA Ultra Turrax T18 mixer; IKA Works, Inc., Wilmington, Del.) 10.0 g of Hombikat UV100 titania (Sachtleben Chemie Gmbh, Duisburg, Germany) with 60. g of deionized water. This mixture was applied to 100 grams of 12×20 mesh Kuraray GG carbon particles by spraying the titania dispersion through a Qorpak finger-actuated trigger-sprayer (Qorpak, Bridgeville, Pa.) as a fine mist onto a shallow bed of the GG carbon uniformly spread out on a glass tray. The bed of carbon particles was mixed gently using a rubber spatula after each 1-2 sprays to provide a uniform coating of the titania dispersion on the carbon particles. After the addition of the titania, the titania-coated particles were dried at 100° C. in an oven for 30 minutes and then at 150° C. for 1 hour.

5 mL of each (2.1 g) were tested against a 1000 ppm cyclohexane challenge at 1.6 L/min using the method described in test procedure 2. The GC was equipped with a 6 ft 10% SE-30 on Chromosorb W—HP 80/100 column for analysis of cyclohexane instead of CO.

Figure 14:
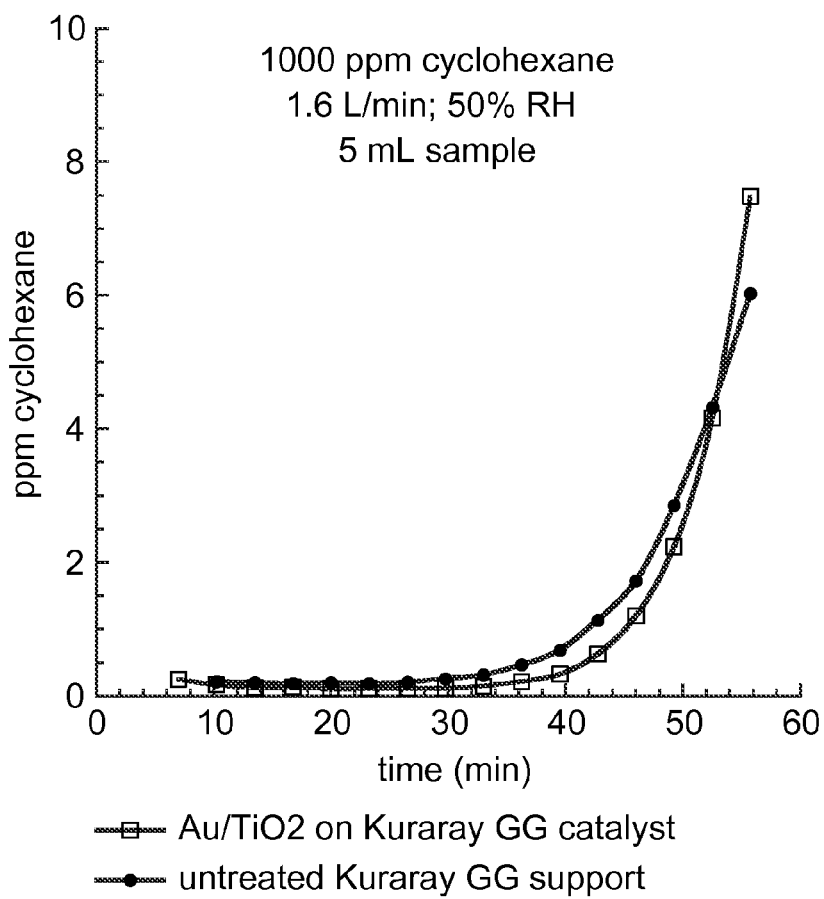
FIG. 14 is a graph demonstrating the results of Example 9.

The results are shown in FIG. 14. The abilities of both samples to protect against cyclohexane are quite similar. Surprisingly, the titania coating of the composite catalyst system did not unduly interfere with the fast transport of organic vapor molecules into the internal pore volume of the activated carbon support host. This illustrates that the carbon host incorporated into composite catalysts of the present invention retain appreciable capacity for physical adsorption. This dual functionality is advantageous for use in a respirator filter.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making a catalyst system comprising nanoporous composite particles, the method comprising the steps of:
    forming catalytically active elemental gold clusters of dimensions of about 0.5 nm to about 50 nm on a plurality of guest particles by a process consisting essentially of physical vapor deposition; and,
    incorporating the plurality of guest particles onto carbonaceous host particles to form a plurality of nanoporous composite particles,
        wherein the ratio of the volume average particle size of the host particles to the guest particles is greater than about 3:1.

2. The method of claim 1, wherein the guest particles comprise nanoporosity.

3. The method of claim 1, wherein aggregates of the guest particles comprise nanoporosity.

4. The method of claim 1, wherein the carbonaceous host particles comprise nanoporosity.

5. The method of claim 1, wherein the carbonaceous host particles comprise activated carbon particles.

6. The method of claim 1, wherein the guest particles comprise titania particles.

7. The method of claim 1, further comprising the step of impregnating a water soluble metal salt onto at least the guest particles, wherein said impregnation occurs prior to the physical vapor deposition of the gold.

8. The method of claim 1, further comprising the step of impregnating a water soluble metal salt onto at least the carbonaceous host particles, wherein said impregnation occurs after the physical vapor deposition of the gold.

9. The method of claim 8, wherein the water soluble salt is selected from the group consisting of alkali metal salts, alkaline earth salts, and combinations thereof.

10. The method of claim 1, wherein the gold is physically vapor deposited on the guest particles before the guest particles are incorporated onto the carbonaceous host particles to form the plurality of nanoporous composite particles.

11. The method of claim 1, wherein the gold is physically vapor deposited on the guest particles after the guest particles are incorporated onto the carbonaceous host particles to form the plurality of nanoporous composite particles.

12. The method of claim 1, wherein the forming of the catalytically active elemental gold clusters of dimensions of about 0.5 nm to about 50 nm on the plurality of guest particles is by a process consisting essentially of physical vapor deposition of elemental gold.

13. The method of claim 1, wherein the guest particles and the carbonaceous host particles are mixed and comminuted during at least a portion of the time in which physical vapor deposition of the gold occurs.

14. The method of claim 1, wherein the nanoporous composite particles are prepared by a method comprising physically mixing the guest particles and the host particles.

15. A method of oxidizing CO, comprising the steps of:
    providing a catalyst system comprising nanoporous composite particles,
        wherein the nanoporous composite particles each comprise a plurality of guest particles on a carbonaceous host particle wherein the ratio of the volume average particle size of the carbonaceous host particles to the guest particles is greater than about 3:1 and wherein the guest particles comprise catalytically active elemental gold clusters of dimensions of about 0.5 nm to about 50 nm formed on the guest particles by a process consisting essentially of physical vapor deposition; and,
    causing the catalyst system to catalytically contact the CO.

16. The method of claim 15 wherein the oxidizing of CO occurs in a respiratory protection system.

17. The method of claim 16 wherein the oxidizing of CO occurs in a personal respiratory protection system.

18. The method of claim 17, wherein the personal respiratory protection system is selected from the group consisting of a mask and an escape hood.

19. The method of claim 15, wherein the carbonaceous host particles comprise activated carbon particles.

20. The method of claim 15, wherein the guest particles comprise titania particles.

21. The method of claim 20 wherein the carbonaceous host particles comprise activated carbon particles.

22. The method of claim 15, wherein the nanoporous composite particles comprise at least one water soluble metal salt.

23. The method of claim 22, wherein the water soluble metal salt is selected from the group consisting of an alkali metal salt, an alkaline earth metal salt, and mixtures thereof.

24. The method of claim 23 wherein the guest particles comprise titania particles and the carbonaceous host particles comprise activated carbon particles.

* * * * *

UNITED STATES PATENT AND TRADEMARK OFFICE
CERTIFICATE OF CORRECTION

PATENT NO. : 8,314,046 B2
APPLICATION NO. : 13/167388
DATED : November 20, 2012
INVENTOR(S) : John T Brady et al.

Page 1 of 1

It is certified that error appears in the above-identified patent and that said Letters Patent is hereby corrected as shown below:

In the Specifications:

Column 31
Line 34, Delete "ton." and insert -- torr. --, therefor.

Signed and Sealed this
Seventh Day of May, 2013

Teresa Stanek Rea
*Acting Director of the United States Patent and Trademark Office*